United States Patent
Rolle et al.

(10) Patent No.: US 12,132,561 B2
(45) Date of Patent: Oct. 29, 2024

(54) SATELLITE COMMUNICATION SYSTEM

(71) Applicant: ST ENGINEERING IDIRECT (EUROPE) CY NV, Sint-Niklaas (BE)

(72) Inventors: Alain Rolle, Ghent (BE); Philippe Delbeke, Wilrijk (BE)

(73) Assignee: ST ENGINEERING IDIRECT (EUROPE) CY NV, Sint-Niklaas (BE)

( * ) Notice: Subject to any disclaimer, the term of this patent is extended or adjusted under 35 U.S.C. 154(b) by 368 days.

(21) Appl. No.: 17/586,190

(22) Filed: Jan. 27, 2022

(65) Prior Publication Data
US 2022/0149930 A1    May 12, 2022

Related U.S. Application Data

(63) Continuation-in-part of application No. PCT/EP2020/070112, filed on Jul. 16, 2020.

(30) Foreign Application Priority Data

Jul. 29, 2019 (EP) ..................................... 19188950

(51) Int. Cl.
*H04W 4/00*        (2018.01)
*H04B 7/185*       (2006.01)
(Continued)

(52) U.S. Cl.
CPC ..... *H04B 7/18508* (2013.01); *H04B 7/18515* (2013.01); *H04B 7/18586* (2013.01); *H04L 1/0057* (2013.01); *H04L 5/0005* (2013.01)

(58) Field of Classification Search
CPC ............ H04B 7/18508; H04B 7/18515; H04B 7/18586; H04B 7/18517; H04B 7/185;
(Continued)

(56) References Cited

U.S. PATENT DOCUMENTS 5,587,939 A * 12/1996 Soleymani ................ H04J 1/05
                                                           708/319
6,377,561 B1    4/2002 Black et al.
(Continued)

FOREIGN PATENT DOCUMENTS

EP         2619924 B1    6/2017
WO      2012038380 A1    3/2012

OTHER PUBLICATIONS

Extended Search Report and Written Opinion from corresponding European Application No. EP19188950.0, Jan. 29, 2020.
(Continued)

*Primary Examiner* — Stephen M D Agosta
(74) *Attorney, Agent, or Firm* — Workman Nydegger

(57) ABSTRACT

A system for communication via satellite between a gateway and a plurality of terminals comprises: a controller device to calculate a time-frequency plan of burst signals from a terminal and to transmit, based on the time-frequency plan, to the terminal information including configuration information on transmit burst signals; a multi-carrier demodulator structure arranged to receive a resulting signal comprising receive signals and arranged to receive information for the receive signals. The multi-carrier demodulator structure has multi-carrier demodulator devices, each with a channelizer to serialize the receive signals, yielding a serialized stream of sample segments corresponding to the receive signals, a processing block to receive that stream of sample segments and to perform demodulation of the sample segments based on the sample segment content, on a state indicative of the receive signal to which the sample segment belongs and on said receive information, pre-FEC word aggregation, demapping and decoding.

25 Claims, 9 Drawing Sheets

(51) Int. Cl.
*H04L 1/00* (2006.01)
*H04L 5/00* (2006.01)

(58) Field of Classification Search
CPC ... H04L 1/0057; H04L 5/0005; H04L 5/0044; H04L 5/0048
See application file for complete search history.

(56) References Cited

U.S. PATENT DOCUMENTS

| | | | |
|---|---|---|---|
| 6,493,358 B1* | 12/2002 | Soleymani | H04L 5/06 370/480 |
| 8,831,121 B1 | 9/2014 | Qi et al. | |
| 9,621,204 B2 | 4/2017 | Qi et al. | |
| 2005/0002325 A1* | 1/2005 | Giannakis | H04L 5/0044 370/208 |
| 2005/0213526 A1* | 9/2005 | Malkemes | H04B 7/18523 370/312 |
| 2006/0039273 A1* | 2/2006 | Gore | H04L 27/0008 370/208 |
| 2007/0032256 A1* | 2/2007 | Kolze | H04W 52/225 455/69 |
| 2007/0126612 A1 | 6/2007 | Miller | |
| 2010/0046657 A1* | 2/2010 | Karlsson | H04L 1/0618 375/267 |
| 2011/0026577 A1* | 2/2011 | Primo | H04L 25/0212 375/232 |
| 2011/0051846 A1 | 3/2011 | Gilbert et al. | |
| 2015/0071203 A1* | 3/2015 | Lee | H04L 5/0044 370/329 |
| 2015/0304925 A1* | 10/2015 | Hwang | H04J 11/005 370/329 |
| 2015/0318975 A1* | 11/2015 | Lim | H04B 1/0057 370/275 |
| 2016/0302201 A1* | 10/2016 | Earnshaw | H04L 5/005 |
| 2017/0207934 A1 | 7/2017 | Iyer Seshadri et al. | |
| 2018/0212733 A1* | 7/2018 | Khoryaev | H04L 5/0007 |
| 2019/0364525 A1* | 11/2019 | Yu | H04W 56/001 |
| 2020/0136764 A1* | 4/2020 | Zhang | H04L 1/0057 |
| 2021/0028897 A1* | 1/2021 | Park | H04L 5/0094 |
| 2021/0176643 A1* | 6/2021 | Jang | H04W 16/10 |
| 2021/0242998 A1* | 8/2021 | Park | H04L 5/0092 |
| 2023/0261784 A1* | 8/2023 | Shilo | H04L 1/0625 714/726 |

OTHER PUBLICATIONS

International Search Report and Written Opinion from PCT Application No. PCT/EP2020/070112, Oct. 6, 2020.

\* cited by examiner

Superframe type I

SATELLITE COMMUNICATION SYSTEM

FIELD OF THE INVENTION

The present invention is generally related to the field of satellite communication systems.

BACKGROUND OF THE INVENTION

Satellite communication services are important in various fields since many decades. Examples are Internet over satellite for consumers, but also for enterprises (e.g. oil rigs) and government and defense applications.

Two-way satellite communication services in general are considered, where there is a link from a hub to a terminal, called the forward (FWD) link, and a link from the terminal to the hub, called the return (RTN) link. In the case of multiple terminals per hub, this network is referred to as a star network. A typical satellite two-way star network is illustrated in FIG. 1. A hub or gateway (1) communicates with a terminal (3) via at least one satellite (2). In such a system, multiple terminals may be covered through a single hub. A satellite communication service may contain several hubs.

In the return link of such a star network (where many terminal transmitters transmit to few gateway receivers), the terminals share the satellite resources, meaning that the terminals must be organized to transmit orthogonal signals (i.e. signals not interfering in time or frequency). This is typically achieved by slaving all terminals to a common gateway reference such as the network clock reference (NCR), which is a counter increasing at an internal clock rate which is synchronized with GPS time, cf. DVB-S2 Annex G.5. This slaving of all terminals to a counter from the hub is realized by including periodically the current NCR value in the forward transmission signal from the hub to the terminals.

The receive terminals are grouped in one or more satellite networks (here referred to as satnets). A satnet here is defined as follows. In one implementation terminals in the same satellite network demodulate the same forward (FWD) carrier at the same time in a same contour and transmit carriers in the return link which are demodulated by the same multi-carrier demodulator (MCD). In another implementation, the FWD and RTN signals can be Orthogonal Frequency Division Multiplexing (OFDM) waveforms, such as in 5G. There exist ways to slice a FWD carrier in time slices (cf. DVB-S2 Annex M) and a satnet may be limited to terminals demodulating a selected set of time slices of a FWD carrier. Typically, a ratio of throughputs in the forward and return link is aimed at. If a FWD link grows in symbol rate (and consequently throughput), this ratio can be maintained by having more than one MCD demodulating said carriers in the return link. This does not lift the requirement to demodulate as many transmit carriers as possible in a single MCD in order to minimize the number of MCDs that are needed, leading to a lower capital expenditure. A controller (e.g. hosted on a central processing unit (CPU) processor on a blade server) is responsible for handling forward and return (also referred to as inbound and outbound) traffic associated to a satnet. A blade server is a stripped-down server computer with a modular design optimized to minimize the use of physical space and energy. In the case of a transparent satellite or bent-pipe satellite, which is especially amplifying the signal before sending it to the hub, the one or more multi-carrier demodulators are located in the hub. In the case of a regenerative satellite the signal is demodulated on-board the satellite, thus the multi-carrier demodulator(s) is/are on-board the satellite in that case.

Terminals in the same satnet share the available spectrum of that satnet in a multiple frequency time division multiple access (MF-TDMA) framework. Each terminal is assigned a portion of time and frequency spectrum for transmission. This is typically visualized through a time-frequency diagram in the time-frequency plane. The allocation of time and frequency slots, also referred to as resource allocation or scheduling, is performed in a central control unit. The central control unit is sometimes referred to as a controller or scheduler. The resource allocation is typically based on terminal capabilities (e.g. maximum power, maximum symbol rate in the case of single carrier transmission or maximum aggregated carrier bandwidth in the case of OFDM transmission), link quality (e.g. the signal-to-noise ratio (SNR) associated with the link from each of the terminals, interference, signal-to-amplifier distortion ratios, etc.), terminal capacity requests (e.g. the payload size it wants to transmit over the next scheduling interval, e.g. the next 40 ms, where payload refers to data bits), total link capacity (total bandwidth available), service level agreements (some terminals may get priority over other terminals based on the contract with the service provider) and fairness (especially for the same priority class terminals). Indeed, the controller manages capacity to have a fair distribution of the available capacity in congested cases where not all capacity requests can be fulfilled. There are numerous algorithms to perform this resource allocation in an efficient and performant way, see e.g. "Performance of fully variable demand assignment SS-TDMA system" (Maral and Bousquet, October 1987, International Journal of Satellite Communications, pp. 279-290).

In order to have flexibility in resource assignment to a given terminal, terminals can be assigned to a different amount of time slots and frequency bins over time. The rules to assign time and frequency resources to terminals, and the waveform definition mapped to this multiple access channel can be proprietary or standardized. One example of such a standard is Digital Video Broadcasting—Return Channel via Satellite (DVB-RCS and its second version, DVB-RCS2). Another example is 5G New Radio (NR), where OFDM is used. 5G has been standardized by 3GPP for terrestrial communication and is being extended as of release 17 for non-terrestrial networks (NTN) such as satellite networks (satcom). More specifically, 5G NR based NTN has been an important focus in 3GPP. NR was designed for forward compatibility, including high frequency bands. NR-NTN has been studied in releases 15 and 16, and it became a work item for release 17. The main focus to extend 5G to NTN has been to add amongst other things (1) a frequency division duplex mode (FDD) to separate FWD and RTN transmissions, as is typically done over satellite in contrast to a time division duplex (TDD) mode which becomes problematic over satellite due to the long latencies in satcom; (2) adjusting timing advance (TA) algorithms and extending some MAC and RLC timers; (3) improving/disabling HARQ. It will further be shown that those adjustments are not sufficient to yield a competitive solution with respect to satellite specific waveforms like DVB-S2X.

A 'burst' is a continuous-time (hence, without guard time in between) carrier from a particular terminal in the return link (from terminal to satellite to gateway). A burst contains known symbols (a preamble, pilot symbols) for synchronization and identification, and data symbols or information symbols. In order to have an efficient transmission, i.e., less guard time and less overhead (as there is only one preamble in a burst), longer bursts are of interest. A long burst can contain multiple forward error correcting (FEC) words, potentially thousands of FEC words.

Similarly in 5G a burst is a set of resource elements (REs) on the OFDM grid originating from a same terminal in the return link or with the same destination in the forward link. The OFDM grid is the grid of REs formed by adjacent OFDM subcarriers (in frequency) and consecutive symbols (in time). The REs form the smallest units of the resource grid made up of one subcarrier in frequency domain and one OFDM symbol in time domain. The burst can contain reserved REs for channel estimation, signalling or other channels inside the allocated block of symbols. Inside each burst a few pilot REs are provided for proper synchronisation, time estimation and phase estimation of the bursts. Those signals are referred to as Demodulation Reference Signal (DMRS) and Phase Tracking Reference Signal (PTRS). In 5G a burst cannot cross a slot boundary. A burst can consist of 2 to 14 consecutive OFDM symbols. The concept of slot aggregation defined in 5G is a way to repeat multiple transmission of the same transport block in multiple consecutive (not necessarily adjacent) slots with different redundancy versions. Slot aggregation allows more robust reception in edge of cell scenarios, but is not intended for overhead reduction.

In DVB-RCS2 the notion of bandwidth time unit (BTU) determines how to map payload bits from terminals to time and frequency resources. Several types of BTUs can be defined to assign portions of the time-frequency plane to a terminal. This is illustrated in FIG. 2. DVB-RCS2's notion of a superframe is in this description referred to as a "frame".

As described in Annex A of the DVB-RCS2 standard, there are a finite number of waveforms (a combination of a FEC (forward error correcting) coding rate, a FEC code length or equivalently a payload length, a mapping scheme (e.g. QPSK or 16-QAM), a pilot scheme specifying where to put the known pilot symbols for synchronization). If a burst contains one FEC word, BTU types can be defined such that at the bandwidth of a BTU type, a FEC fits in e.g. 1, 2, 3, . . . , or 6 BTUs. In the case of six BTUs, this can be implemented having six consecutive BTUs in time or six parallel BTUs in frequency.

The idea behind defining the BTUs in DVB-RCS was to allow the multi-carrier demodulators to demodulate all carriers in a feasible low-cost way, for example, using a channelizer which can select bandwidths being a multiple of the bandwidth of a BTU. This typically results in BTU types as in FIG. 2. The condition then of course is that BTU types do not change in a dynamic and completely free way every superframe. In addition, the idea of having BTUs was to reduce the signalling needed to signal a time-frequency scheduling to terminals via the forward link.

The BTU definition results in a finite granularity in time and frequency. This makes it difficult to fit a multiple of FEC words in a multiple of BTUs, which is shown in FIG. 3. For example, a combination of modulation and coding can be defined to fit a preamble, payload and pilot symbols, and postamble in six BTUs. In case this terminal needs to transmit twice the amount of payload symbols (as it has more data to transmit), it occupies twelve BTUs as shown in the figure. This, however, results in a portion of the time-frequency plane remaining unused, as a burst contains only a single preamble and postamble. Similarly, different FEC word sizes can apply, depending on the coding rate or the amount of payload to be transmitted. Those different FEC word sizes does not map well on a finite BTU granularity, similarly to fitting multiple FEC words. In conclusion, having a finite time and frequency granularity results in more unused portions in the time frequency plane as illustrated in FIG. 3. In other words, a burst will contain more dummy symbols to stuff the BTUs. In addition, if the link budget to a terminal changes such that a more efficient modulation and coding can be used, all six BTUs will also not be filled when transmitting a single FEC word. In that case, there is also stuffing with dummy symbols. There is thus a need for a time-frequency scheduling, wherein unneeded stuffing with dummy symbols inside the bursts from carriers is avoided.

Bursts in 5G are composed of a set resource elements (REs) in an OFDM time and frequency grid. The choice of REs, modulation type and code rates are allocated to terminals by a scheduler based on terminal needs and link conditions. This mechanism also results in a finite granularity in time and frequency. So the allocated resources will typically not fit an integer number of FEC words. In 5G the mismatch is solved via a rate matching function that applies extra puncturing when needed. Fitting a number of FEC words in allocated time frequency resources can this be done through puncturing or padding (also known as stuffing the burst). Obviously, other techniques known to the art such as augmenting, expurgating, extending, lengthening and shortening can be combined with the invention as described below. Puncturing avoids padding symbols but results in only an approximate FEC rate and, even for a fixed allocation from slot to slot, some changes in the FEC rate from slot to slot because of variations in the reserved REs from slot to slot. This is because the exact number of reserved REs for other channels or for channel sounding can change from slot to slot. There is thus a need for longer bursts across multiple slots where not all overhead is repeated in every slot and allowing an easier fit of code words to available REs without FEC rate changes.

In the return link the ground station (in the case of a transparent satellite) or on-board (in the case of regenerative satellites) multi-carrier demodulators demodulate and decode all carriers from all terminals in a satnet. The device (or devices) demodulating and decoding these carriers is referred to as a multi-carrier demodulator (MCD). An MCD significantly contributes to the cost of a ground segment. Consequently, there is a need to maximize the number of carriers that can be demodulated by a single MCD. The MCD puts constraints on the time-frequency scheduling as the proposed time-frequency plan needs to be decodable by a single MCD. In OFDM the concept of "multi-carrier" in MCD can be understood as multiple simultaneous bursts on different OFDM carriers.

The overall efficiency of the return link can be expressed as the number of useful bits transmitted over a frame divided by the multiplication of the time duration of that frame (including the guard time) and the frequency bandwidth available for that satnet in the return link:

$$\text{efficiency} = \frac{\text{number of useful bits transmitted over a frame}}{\text{time duration of a frame} * \text{frequency band width used}}$$

The efficiency can be improved by having longer bursts (less overhead and guard time). There is thus a need for a solution wherein such longer bursts can be applied. This need equally applies in satellite networks adapted for 5G. Even in the case of slot aggregation, where a terminal transmits multiple subsequent slots, the DMRS symbol to let the demodulator acquire the signal in a slot is repeated in every slot. Simulations show that the 5G NR physical layer is substantially less efficient than state of the art satellite waveforms like DVBS2X or MF-TDMA waveforms using an MCD as described below. There is thus, at least for satellite communication, a need for a more efficient 5G scheme, where longer bursts span multiple slots and where certain overhead is not repeated in every slot, as well as for a demodulator structure that can deal with the absence of such overhead in all slots but the first. The efficiency can also be improved by allowing a terminal to transmit at higher power without saturating a terminal's block-up converter. There is thus a need for a smart controller to maximize the terminal power without oversaturating a satellite terminal's block-up converter and to minimize overhead, by adjusting terminal transmission parameters (e.g. the numerology or the number of carriers, the known symbol composition and the power) to the communication link quality in a smart way.

It is important to allow the same MCD to demodulate one large carrier from one terminal (e.g. a cruise ship or an airplane) as well as to demodulate many small carriers from many terminals (e.g. broadband consumers) or a combination larger continuous carriers with an MF-TDMA grid servicing multiple terminals with lower throughput requirements, which would make the MCD usable for many different applications. Indeed, developing separate MCD products for separate applications is very costly from an engineering point of view. There is thus a need to maximize the scalability of an MCD to demodulate one large carrier up to many small carriers, e.g. 1000 small carriers. Relevant applications today, e.g. in maritime communications or in SCADA applications (e.g. connecting wind turbines), require addressing around 8000 terminals every 40 ms. As mentioned before, if 16000 terminals are needed in a satnet, then 2 MCDs can be combined in a satnet in the case an MCD is limited to 8000 terminals. Still, managing a satnet of 16000 terminals with 2 MCDs that can each demodulate 8000 terminals will cost much less than with 667 MCDs that can each demodulate 24 carriers.

In the prior art two types of multi-carrier demodulators (MCD) can be distinguished. In one type the MCD has multiple demodulators in parallel, each decoding a carrier, of which the symbol rate can change each frame (see for example EP2619924B1). In this case it is not known upfront, i.e. when designing the MCD, how wide each carrier is in the frequency domain and it is not always possible to time-multiplex each demodulator block to reduce the employed resources when the carrier frequency bandwidth reduces. In other words, this concept thus limits the scalability, as e.g. 1000 demodulators in parallel obviously would be too computationally complex. For example, the return link technology described in WO2012/038380 allows up to 24 carriers for a single MCD using for example a state of the art Arria 2 FPGA from Altera. FIG. 4 implements a time-frequency plan according to an MCD with multiple demodulators in parallel. There is no limit in the burst length as there is no need to buffer bursts in the case of having a dedicate modulator per burst, but the number of parallel bursts is limited by the number of parallel demodulators in the MCD, e.g. to 24 parallel bursts. A second type of MCD first buffers an entire burst before starting the demodulation and decoding of said burst. One example of this approach is found in U.S. Pat. No. 8,831,121 B1. Typically, a channelizer serializes parallel bursts after the ADC in the multi-carrier burst demodulator. The channelizer output is typically a serial single stream of samples, consecutively containing bursts (each burst containing fractions or an integer number of coded frames of a particular user), which are around the central frequency of the carrier sent by a particular terminal. This stream of samples is then matched filtered. In case a terminal receiver is configured to receive 5G signals, the channelizer and matched filter are replaced by an OFDM receiver, e.g. comprising FFT processing. The streams of samples are then demapped to a stream of log-likelihood ratios and finally decoded, resulting in baseband packets, one per decoded code word sent by a particular user. The baseband packets are subsequently decapsulated. Multiple carriers are then processed while there is still only one matched filter and decoder. Multiple chunks of a burst of a carrier are first collected or aggregated before passing it to the demodulator (including the matched filter). This way, one wants to avoid a challenging saving and restoring of states when processing multiple chunks of a burst by a demodulator on distinct time instances. This saving and restoring of states is very difficult, if not impossible, in conventional systems, as acknowledged in U.S. Pat. No. 8,831,121. The approach proposed in U.S. Pat. No. 8,831,121 requires a lot of memory as a buffer per carrier is required, for possibly 1024 carriers. In the description of U.S. Pat. No. 8,831,121 is said that the "depths of all channel buffers are identical". Moreover, the buffering introduces a lot of jitter. A burst should span thousands of FEC words as stated above, to have the targeted efficiency. However, in a practical implementation the buffering of entire bursts to prevent the need to save states of blocks on the MCD, creates a jitter with a duration of thousands of FEC words, which is unacceptable, not yet mentioning the memory needed to store those bursts. Therefore, state-of-the art systems with MCDs of the above type do not have that many parallel carriers and/or have short bursts. FIG. 5 implements a time-frequency plan using burst lengths which lead to an acceptable jitter specification (thus bursts being short enough). It is however clear that such a concept with shorter bursts is less efficient as each burst contains a header or preamble for example. Although resulting in higher overheads, the latter solution is used in 5G. Keeping bursts short offers some advantage in terrestrial communication due to the fast changing channel and the fast allocation possibilities. In satellite links the channel conditions are more stable and the relatively long latency of the satellite link does not allow for fast reallocation. Consequently, a better trade-off between burst size and efficiency can be found, improving the physical layer efficiency for 5G over satellite links. However, recent evolutions made in 5G-NR release 17 show such better trade-offs are not straightforward for the art as they are not included.

The following example explains why buffering entire bursts, containing multiple FEC words, introduces a considerable amount of buffering and, consequently, jitter. Take an example where a burst consisting of 1000 FEC words is transmitted at 30 Mbaud (i.e., 30e6 symbols per second are sent), and each FEC word is transmitted using 30000 symbols. Hence, it takes 1 ms to transmit a FEC word, and 1 second to transmit a burst. In the terminal transmitter, each 1 ms a FEC encoding is performed and the corresponding codeword is mapped to symbols, pulse shaped and transmitted to the satellite. Hence, the bits before the FEC encoder are buffered at most 1 ms, before being sent. At the terminal receiver the burst is filtered by a channelizer, which has to buffer an entire burst before it can send the samples to the demodulator. This however creates an additional delay of 1 second between the last bit of the previous burst and the first bit of the new burst. In the case of voice communication, such an interrupt of 1 second is unacceptable.

There is thus a need for a time-frequency scheduling, wherein unneeded stuffing with dummy symbols inside the bursts from carriers is avoided, regardless of the link budget (and thus configured modulation and coding) and payload size to be transmitted. There is further a need for an MCD that is scalable and able to process a huge number of carriers, e.g. more than 1000, while it is capable to process long bursts for high efficiency transmission without the need to buffer the entire burst before demodulating. In case of 5G NR new functionality needs to be added, such as long bursts spanning multiple slots with lower overhead (e.g. by not repeating the overhead in every slot) may help to close the gap with satellite waveforms such as DVB-S2X or MF-TDMA waveforms in the return link.

SUMMARY OF THE INVENTION

It is an object of embodiments of the present invention to provide for a system for satellite communication between a gateway and a number of terminals wherein a high number of carriers, e.g. 1000 or more, can be processed and which is also capable of processing long bursts while keeping jitter low. It is a further object of the invention to provide for a system for satellite communication operable according to a time-frequency scheduling, wherein unneeded stuffing with dummy symbols inside the bursts from carriers is avoided.

The above objective is accomplished by the solution according to the present invention.

In a first aspect the invention relates to a system for communication via satellite between a gateway and a plurality of terminals. The system comprises:
  a controller device arranged to calculate a time-frequency plan of one or more transmit burst signals to be transmitted from at least one terminal of a satellite network, satnet, with a given total satnet bandwidth and to transmit information to each terminal of said at least one terminal based on said calculated time-frequency plan in order to allow said terminal to transmit a transmit burst signal comprising one or more forward error correction words, said transmit information for a first class of terminals comprising configuration information on one or more transmit burst signals so allowing said terminal of said first class of terminals to transmit said one or more transmit burst signals in a frame, each transmit burst signal being configured with said configuration information and having a time duration less than or equal to a duration of said frame,
  a multi-carrier demodulator structure arranged to receive a resulting signal comprising one or more receive signals corresponding to the one or more transmit burst signals of the at least one terminal of said satnet, said resulting signal having an aggregate occupied bandwidth less than or equal to the given total satnet bandwidth, and arranged to receive from the controller device receive information for the one or more receive signals, said multi-carrier demodulator structure comprising one or more multi-carrier demodulator devices, each comprising
    a channelizer to serialize slice-by-slice the one or more receive signals at an output rate greater than or equal to the given total satnet bandwidth, wherein a slice is formed by a predetermined number of samples of the resulting signal, yielding a serialized stream of one or more sample segments corresponding to the one or more receive signals, said sample segments referring to a slice portion in the frequency and time domain,
    a processing block arranged to receive said serialized stream of one or more sample segments and arranged to perform
      demodulation of said sample segments based on the sample segment content, on a state indicative of the receive signal to which the sample segment belongs and on said receive information,
      pre-FEC word aggregation,
      demapping and decoding.

The proposed solution indeed allows for dealing with a huge number of carriers and for processing long bursts without noticeable jitter. Indeed, the bursts do not need to be buffered but can be processed in segments. Only the minimal entity, symbols or samples corresponding to a FEC word, is buffered or aggregated through the pre-FEC word aggregation, so substantially reducing the jitter, while allowing long bursts, so minimizing the overhead as there is only 1 preamble per burst. The proposed multi-carrier demodulator structure allows for the use of MF-TDMA transmission schemes in an adaptive way. It gives the controller device freedom to allocate in the return link the required time and frequency resources to the terminals within the time-frequency plane.

If the proposed system is configured for communication of 5G NR signals via a satellite network, the shared time/frequency capacity is mapped to an OFDM grid. The channelizer is then rather an OFDM receiver that serializes slice-by-slice the one or more receive signals wherein a slice is composed of one or more OFDM symbols yielding a serialized stream of subcarrier symbol segments corresponding to different transmissions in the OFDM grid.

Preferably the demodulation comprises matched filtering on a segment-by-segment basis, yielding a stream of symbol segments, and said pre-FEC word aggregation comprises aggregation of symbol segments of the stream which belong to a single forward error correction word. In another embodiment the symbol segments are assembled according to terminal allocation from an OFDM grid after OFDM demodulation, thus in the absence of matched filtering.

In a preferred embodiment the processing block comprises
  a single demodulator arranged to receive the serialized stream of one or more sample segments (or symbol segments) and arranged to, segment-by-segment, demodulate the sample segment based on the content of the sample segment, on a state indicative of the receive signal to which a sample segment belongs and on the receive information, yielding a serialized stream of symbol segments,
  a pre-FEC word aggregator arranged to aggregate symbols of the serialized stream of symbol segments which belong to a single forward error correction word of the one or more forward error correction words,
  a demapper and decoder arranged to demap and decode aggregated symbols received from the pre-FEC word aggregator.

In an embodiment the configuration information comprises one or more of a start time, a central frequency, a symbol rate, a power, a modulation and coding type, a known symbol composition, a number of forward error correction words. A controller device comprising such configuration information may in a specific embodiment be combined with a processing block as described in the preceding paragraph.

In preferred embodiments the controller device is arranged to transmit at least once transmit information for a second class of terminals of said plurality, wherein the transmit information for the second class of terminals comprises information on a transmit burst signal including one or more of a start time, a central frequency, a symbol rate and a number of forward error correction words. This allows a terminal of the second class of terminals to send transmit burst signals having a time duration greater than a frame duration.

In one embodiment the controller device is arranged to calculate the time-frequency plan taking into account one or more of: a request for transmission for the first class of terminals, a service level agreement and information related to fairness and signal quality.

The transmit burst signal is preferably shaped with a pulse-shaping filter described by a set of coefficients. In an embodiment there are one or more sets of coefficients to choose from. In a more specific embodiment, there is only one set of coefficients. In an embodiment a roll-off factor is a parameter. Alternatively, the transmit burst is an OFDM waveform composed a subset of the resource elements in the shared time/frequency OFDM grid. This results in a spectrally wider signal than for the above-mentioned shaped waveform. However, due to OFDM properties, the waveform is orthogonal to adjacent OFDM transmissions from other terminals given proper time and frequency alignment between the terminals.

In other embodiments the receive information comprises one or more of a start time, a central frequency, a symbol rate, for each of the one or more receive signals. In yet other embodiments the receive information compromises symbol time identifications and OFDM carrier identification on an OFDM grid, for each of the one or more receive signals.

In embodiments the channelizer is arranged for downconverting and decimating the one or more sample segments using that central frequency. The channelizer may further be arranged to perform the decimation at a fixed oversampling rate with respect to the symbol rate. In a preferred embodiment the fixed oversampling rate is between 1.2 and 1.8. In an OFDM embodiment, where the channelizer is replaced by an OFDM receiver, the receiver isolates the different OFDM subcarriers per transmission symbol segments per receive signal.

Advantageously, the transmit burst signal of each terminal has a time duration of corresponding to an integer number of slots. The proposed solution indeed avoids unneeded stuffing with dummy symbols inside the burst as any symbol rate can be picked such that the transmit burst signal of each terminal has a time duration of an integer number of slots. In an OFDM context, the number of carriers cannot always be adapted to fit an integer number of code words in the allocated resource elements. This can be solved via stuffing per burst or, as proposed in 5G NR, via an extra FEC puncturing step or other FEC manipulations to fit and integer number of FEC words in the allocated OFDM resource elements.

In one embodiment the predetermined number of resulting signal samples is equal to a length of an FFT applied to a version of the resulting signal minus an overlap length. In an OFDM based system the number of resource elements per slice comprises in one embodiment one OFDM symbol.

In a preferred embodiment the channelizer is arranged to attach a configuration ID number to the one or more sample segments. In another preferred embodiment the OFDM receiver is arranged to attach a configuration ID number to the one or more subcarrier symbol segments.

In another embodiment the transmit burst signal comprises a preamble and a plurality of groups of pilot symbols, wherein the size of said groups is related to the communication link quality. In 5GNR OFDM, the preamble and pilots symbols are replaced by known symbols in the OFDM grid (i.e. DMRS and PTRS symbols).

Preferably the single demodulator comprises an acquisition unit, an optional matched filter, a phase tracker and an equalizer. The acquisition unit is arranged to aggregate sample segments to which said preamble belongs based on said receive information and said configuration ID number, to load a portion of said state indicative of the receive signal to which said preamble belongs and to compute one or more of a receive level, a frequency offset, a timing offset and a phase offset corresponding to said receive signal.

In advantageous embodiments the matched filter and/or the phase tracker and/or the equalizer are each arranged to, segment-by-segment, load a further portion of the state based on the receive information and the configuration ID number, and to save information related to a new state indicative of the receive signal to which the sample segment belongs, when the sample segment has been processed.

In embodiments of the invention the system comprises storage to load said state from and to store said new state. That storage may be implemented as a plurality of dedicated embedded RAMS for each of the acquisition unit, matched filter, phase tracker and equalizer to which the state can be distributed in a parallel way.

Advantageously the controller device is arranged to configure the multi-carrier demodulator structure on a slot-by-slot basis, using a logic table with a plurality of rows and two columns.

In yet other embodiments the multi-carrier demodulator structure is arranged to demodulate at a first moment in time a resulting signal of 125 MHz in one frame of 40 ms comprising more than 8000 burst signals from 8000 terminals and in another frame one burst signal having a time duration equal to a frame duration and an occupied bandwidth equal to the total bandwidth and at a second moment in time different from said first moment a continuous time burst signal.

The single demodulator comprises a matched filter arranged to receive the serialized stream of the one or more sample segments and to output I/Q symbol segments containing I/Q symbols. In an embodiment of OFDM demodulation, the symbols are readily available after OFDM reception, so eliminating the need for a matched filter and timing error correction. Small OFDM symbol timing errors do not result in intersymbol interference for Cyclic Prefix-OFDM (CP-OFDM) as proposed in 5G NR.

The system may further be arranged to save the matched filter state after processing the last sample from a sample segment and to read, before starting to process a new sample segment associated to a particular receive signal, the saved state after the previous sample segment from that said particular receive signal.

In the context of 5G aspects of this invention are not limited to the return link, but also apply to the forward link from the hub to the terminals. More specifically, a burst in the forward link according to this invention can span more than one slot. A lower overhead can so be obtained. The terminal receiver only processes the subcarriers associated to the burst signal that were intended for that terminal.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

FIG. 3 shows that a BTU type may map a scenario with 1 FEC word to BTU units without dummy stuffing, which however is not possible in the case 2 FEC words are transmitted in a single burst.

DETAILED DESCRIPTION OF ILLUSTRATIVE EMBODIMENTS

Figure 1:
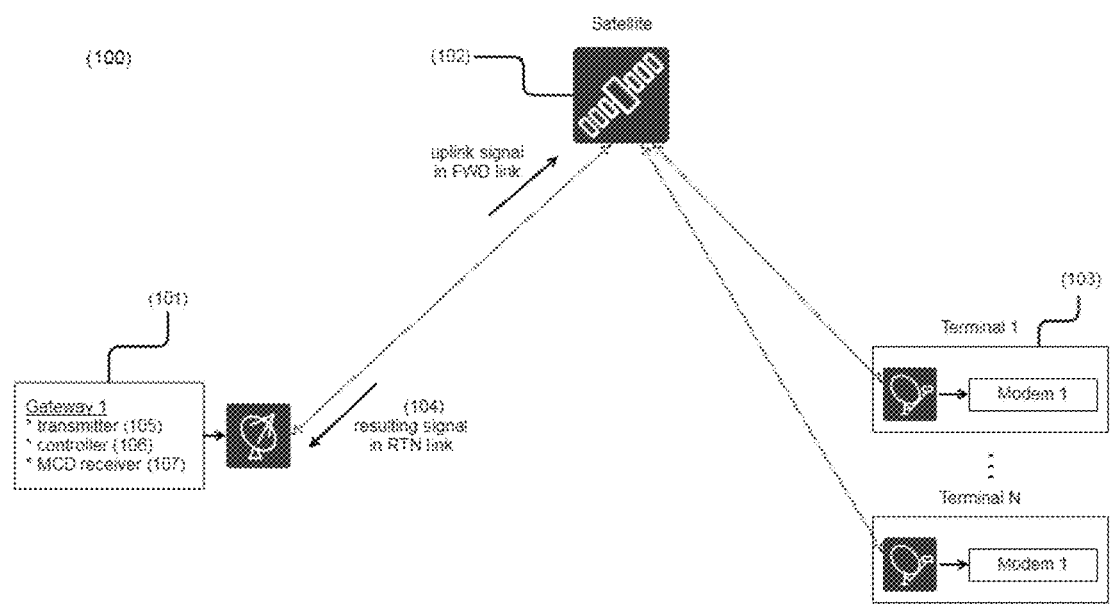
FIG. 1 illustrates a system for communication via satellite including a gateway, a satellite and a plurality of terminals. The gateway includes a transmitter, a controller and a multi-carrier demodulator structure (MCD receiver). The gateway sends an uplink signal to the satellite in the forward link and receives a resulting signal from the satellite in the return link.
Figure 2:
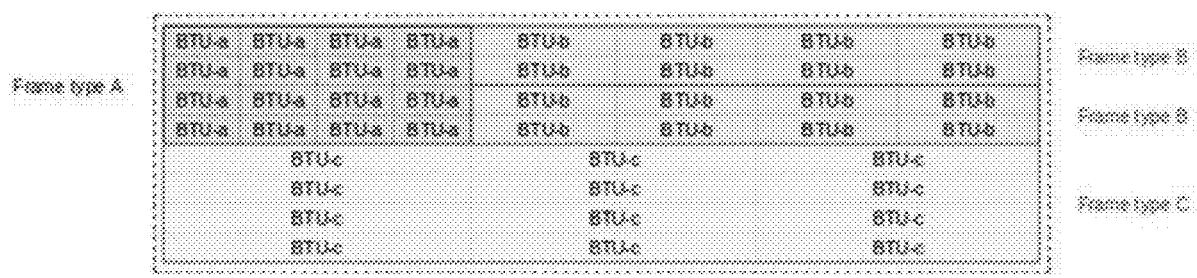
FIG. 2 illustrates how in DVB-RCS2 payload bits from terminals are mapped to time and frequency resources through the notion of bandwidth time unit (BTU). The idea behind defining the BTUs in DVB-RCS was to allow the multi-carrier demodulators to demodulate all carriers in a feasible low-cost way, for example, using a channelizer which can select bandwidths being a multiple of the bandwidth of a BTU.
Figure 3:
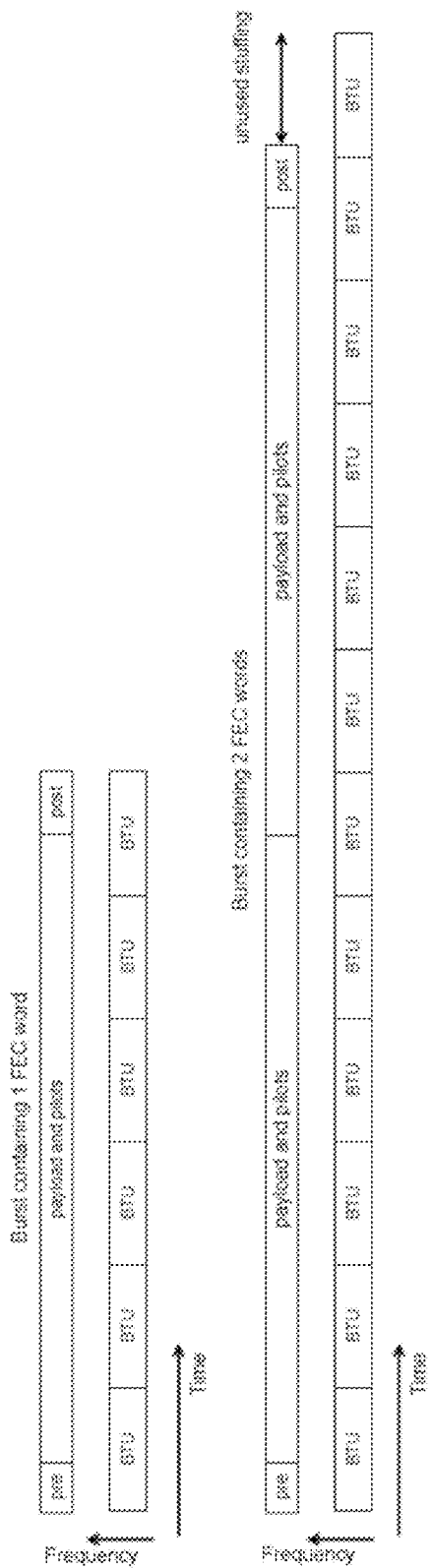
FIG. 3 illustrates the difficulty to fit a multiple of FEC words in a multiple of BTUs, due to the finite granularity in time and frequency resulting from the concept of using BTUs. In particular.
Figure 4:
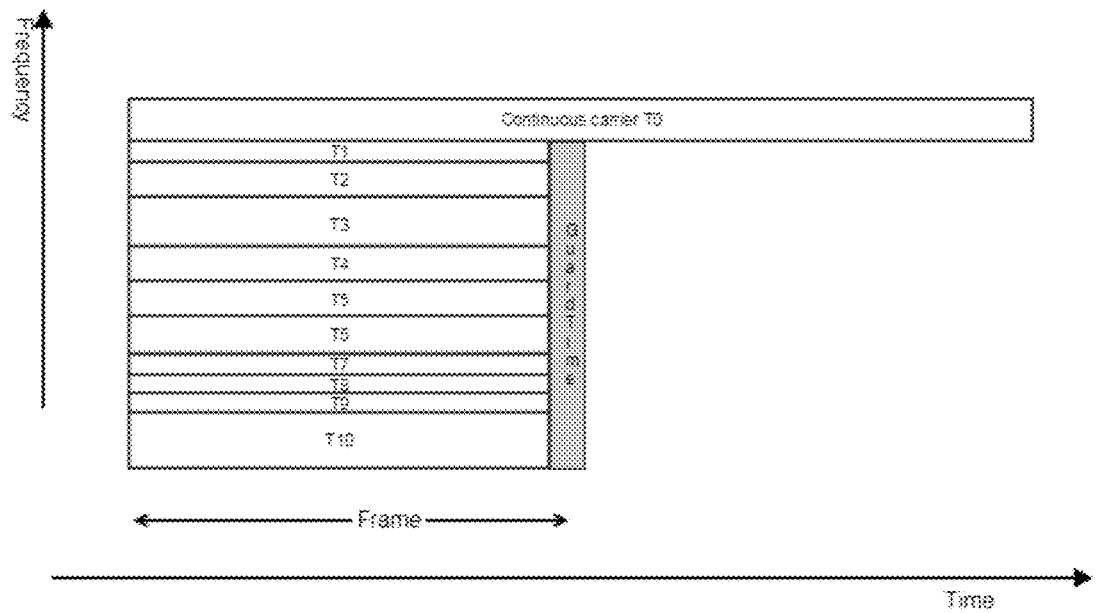
FIG. 4 illustrates a time-frequency plan according to a prior art MCD with multiple demodulators in parallel.
Figure 5:
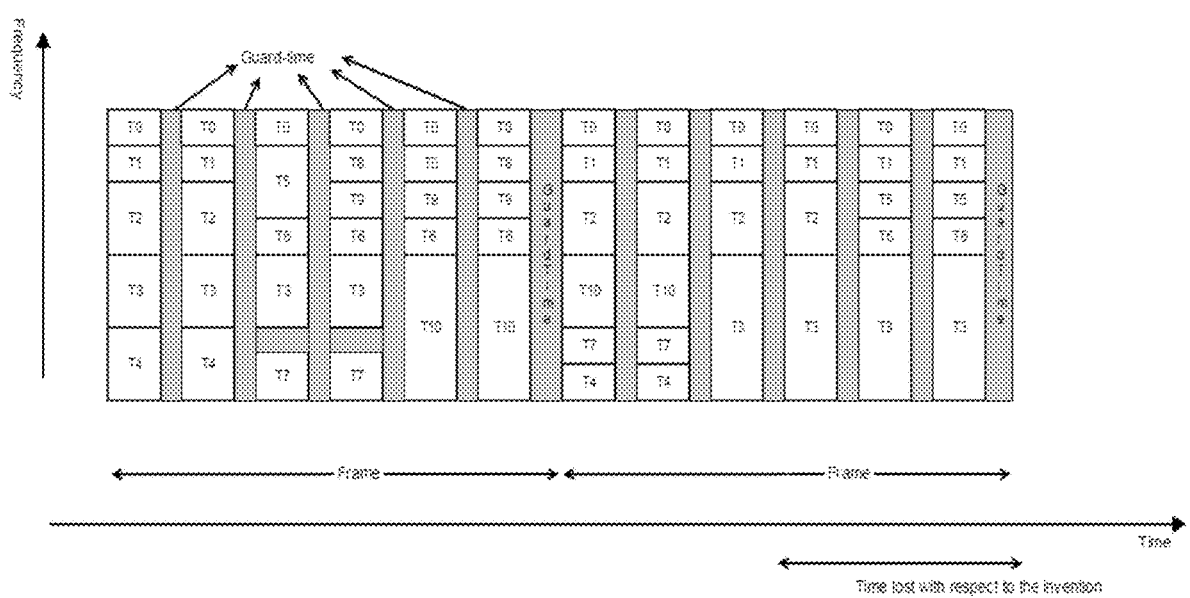
FIG. 5 illustrates a time-frequency plan according to another prior art MCD with shorter bursts. Due to the addition of guard times after each time slot and the inclusion of at least a preamble per transmission (i.e., per white box in the FIG. 5) time "gets lost" in this solution.

The present invention will be described with respect to particular embodiments and with reference to certain drawings, but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this invention a communication system (100) is presented comprising a multi-carrier demodulator (MCD) structure (107) comprising one or more multicarrier demodulator devices, which can be scaled to process a high number of parallel carriers, e.g. more than 1000 parallel carriers, and which can deal with long bursts without the need to buffer the entire burst before the demodulation. Such a multi-carrier demodulator structure allows for a lot of flexibility in resource assignment to a given terminal, as terminals can be assigned to any time duration and frequency bandwidth. The invention further presents a time-frequency scheduling (600) wherein, regardless of the link budget (and thus configured modulation and coding) and payload size to be transmitted, stuffing with dummy symbols inside the bursts from carriers is not needed.

The communication system of the invention is further detailed for a TDMA waveform, but the proposed concepts equally apply to an OFDM waveform. For a multi-user OFDM waveform, a similar mechanism allows for time multiplexed demodulation, resulting in low jitter and low latency demodulation even for longer transmission blocks. The transmitted signal can be composed of multiple code words and multicarrier demodulation can start before the full burst is received, provided that the waveform allows performing synchronisation and tracking on a partial burst. Note that in some embodiments the communication system is arranged for operating both with a TDMA waveform and an OFDM waveform.

The 5G NR (New Radio) waveform standardised by 3GPP features an OFDM waveform and offers short allocation slots of 1 ms or smaller for higher subcarrier spacings (determined by the so called numerology in 5G NR). A short burst offers the advantage that no excessive jitter is introduced while buffering the complete burst before demodulation and that the allocation flexibility is high. However, the overhead is high as every burst must contain known symbols overhead required for channel estimation and acquisition. In terrestrial 5G networks the channel estimates typically cannot be taken from one slot to the other as consecutive slots could contain bursts originating from other sources or as the channel has a smaller coherence time and has changed in the meantime, requiring a re-estimation.

Figure 16:
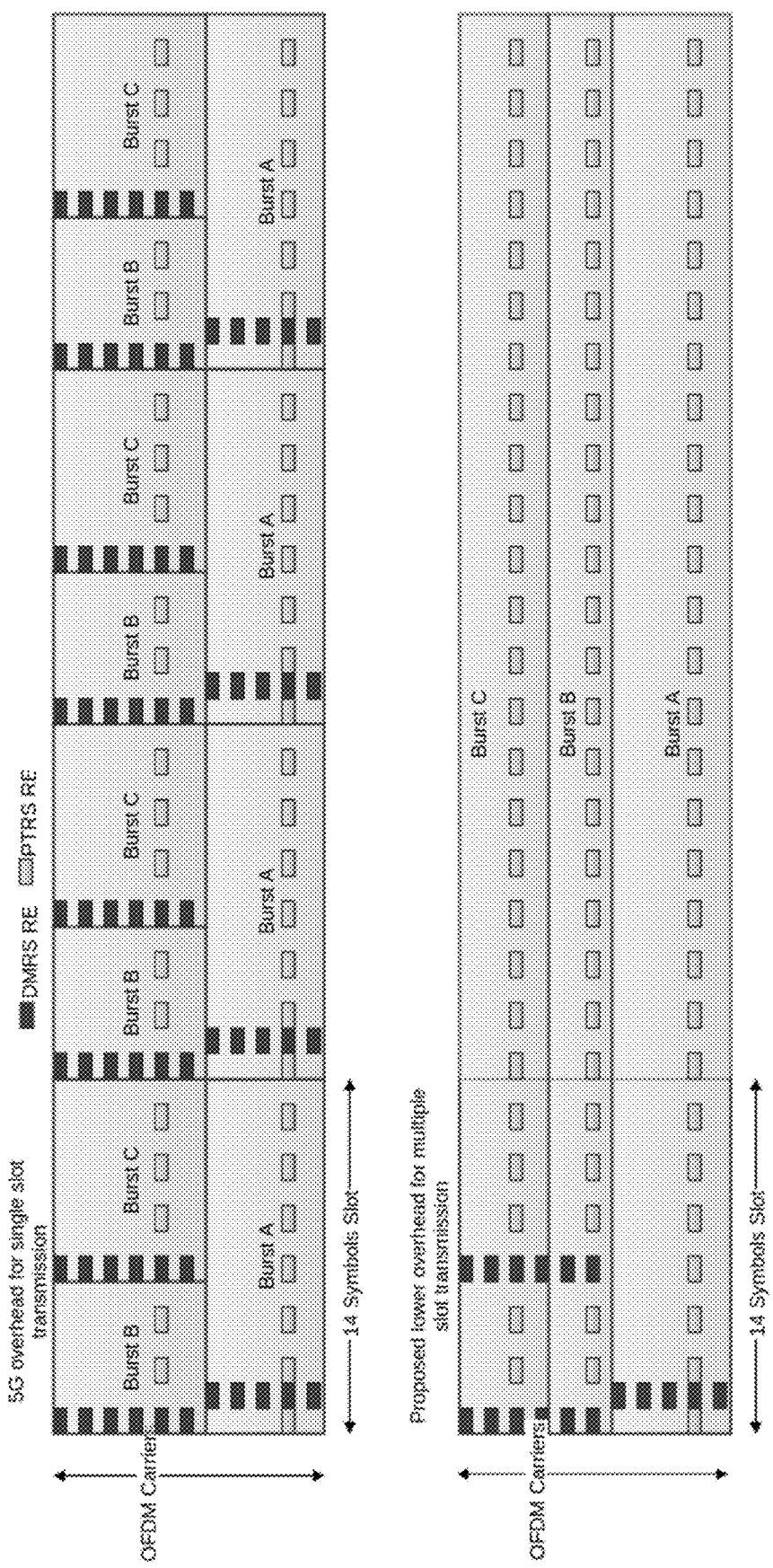
FIG. 16 illustrates the overhead symbol (DMRS and PTRS) in a 5G OFDM transmission and a possible reduced overhead transmission mode with longer transmission periods.

The concepts exposed in this description are applicable to 5G communication via satellite where longer transmissions windows for one terminal are not disadvantageous for the allocation flexibility as the channel latency is the bottleneck and not the resource reallocation speed. The longer transmission window may reduce the known symbols overhead (as shown in FIG. 16) and result in a better fit of the available FEC block sizes to the available REs. Although short transmission slots make sense in terrestrial radio links where channel conditions and traffic demand can change very quickly and/or where the channel latency can be very small, this typically does not hold for non-terrestrial links (such as satellite links or high altitude platform systems (HAPS)) with typically larger latencies. Time multiplexed MCD demodulation proposed here allows for longer transmission bursts (thus relatively less known symbols overhead) without introducing longer latency or jitter or without requiring excessive buffering.

According to 3GPP TS 38.306, the 5G downlink known symbol overhead of Demodulation Reference Signal (DMRS) and Phase tracking reference Signal (PTRS) synchronisation symbols, SRS and CSI-RS channel estimation symbols and lower layer signalling is as high as 14% in the downlink and 8% in the Uplink. More specifically, the DMRS account for at least 3.5% overhead and the PTRS for 1%. The mentioned overhead percentages exclude Cyclic Prefix overhead and OFDM frequency guard bands overhead. In an environment without multipath or MIMO operation, such as satellite links, the 5G known symbol overhead can be optimised according to this invention and most of the known symbols (also known as channel sounding signals) can be removed and combined with standard pilots estimations. For sustained continuous traffic, multiple 5G NR slots can be combined and overhead can be further decreased.

As an example, applying the system for communication of the invention to 5G results in a 5G configuration with a single block of DMRS and with no up to a plurality of PTRS symbols per burst (note, PTRS symbols may be required in satellite channels due to the higher expected phase noise at higher RF frequencies). In a single slot, the lowest standardized single DMRS accounts for 3.5% overhead and the PTRS overhead for 1% (including the PTRS can be made depending on the communication link quality such as phase noise channel conditions and signal-to-noise (SNR)). Thanks to this invention, longer transmission over consecutive slots with lower overhead than when using 5G NR release 17 will not result in increased jitter thanks to the time-multiplexed demodulation. As a consequence, in a particular embodiment shown in FIG. 16, longer transmission over 4 consecutive slots allows decreasing the DRMS overhead to less than 1% (as DMRS symbols only need to be sent in the first slot for initial acquisition), thus keeping only the PTRS overhead constant to 1% by including PTRS symbols in every slot to allow for further tracking. Because of the time multiplexed demodulation and partial burst demodulation by means of pre-FEC word aggregation, the concatenation of more FEC words as an extension to the current 5G standard can result in longer bursts than 1 slot, with less overhead, without introducing extra jitter or processing latency.

In this disclosure the terminals (103) are assumed to have logged in to the network via well-known prior art methods, e.g. see U.S. Pat. No. 6,377,561B1 or U.S. Pat. No. 9,621,204B2 for very low SNR log-on. Log-on can happen in a solicited or unsolicited way. As a result of a log-on, a terminal is known by the controller device. Also, the frequency-offset and timing offset uncertainty are limited after the log-on procedure. For example, the timing offset uncertainty is 12 μs peak-to-peak and the frequency-offset uncertainty is 6 kHz peak-to-peak. More information on log-on can be found for example in DVB-RCS2. Once logged-on, a terminal also receives the NCR via the forward link and it can file a capacity request via a signalling channel to the hub (101). The capacity request can for example comprise the payload size the terminal wants to transmit in a frame, e.g. with a duration of 40 ms. The terminal can send such a capacity request in a frequent manner, for example every frame, e.g. every 40 ms. Based on this capacity request and a number of other criteria, the controller sends via the forward link to the terminal an amount of transmit information comprising a centre frequency, symbol rate, modulation and coding, start and stop time between which the terminal can send its payload.

In the return link terminals send traffic via at least one satellite to the gateway (101) by sending burst signals on an agreed time and frequency. A burst signal (also shortened to 'burst') is a continuous-time (hence, without guard time in between) carrier from a single terminal and is also called a transmit burst signal. Terminals inside a satellite network all send bursts or transmit burst signals within a given total satnet bandwidth (see (603) in FIG. 6). A burst is mostly bounded in time, but the invention also holds for bursts without known end in time (e.g. bursts from a second class of terminals, as further explained, e.g. (601)). The MCD structure receives a resulting signal (104) comprising one or more receive signals corresponding to the one or more signals transmitted by the terminals. The resulting signal received in the MCD structure has an aggregate occupied bandwidth smaller than or equal to that given total bandwidth (603). In order to demodulate the resulting signal in an appropriate way, the MCD structure receives from the controller receive information comprising at least said start time, central frequency, symbol rate, length of the preamble or header, modulation and coding type for each of the signals received from the various terminals. In a preferred embodiment the controller device sends this receive information to the MCD structure every slot (e.g. every 5 ms) such that the MCD structure does not need to store too much signalling. The receive information can be transferred for example over UDP/IP to an FPGA in the MCD structure.

The MCD structure performs synchronization, for example based on known symbols inside the burst (such as the header and pilots). The synchronization is typically performed by an acquisition unit (1103), matched filter (1104), a phase tracker and equalizer (1105). The frequency offset, channel gain (level and phase) and time-offset are estimated by the acquisition unit on the header inside the preamble and further fine-tracked by a matched filter and phase tracker over the entire burst. A special signal quality estimator can also estimate the signal-to-noise ratio, signal-to-distortion ratio, phase noise, fading on uplink and downlink, etc. The burst parameters such as time-offsets, frequency-offsets, signal-to-noise ratio monitoring, signal to distortion ratio monitoring, phase noise monitoring and so on, are used by the central controller device to signal adjusted transmit parameters to the terminals, such as an adjusted start time of transmission, adjusted centre frequency, adjusted modulation and coding, another power and symbol rate (or another numerology in the case of 5G; note instead of signalling another numerology, it may make more sense to move the terminal from one satnet with a particular numerology to another satnet with another numerology), a particular known symbol composition (i.e. length of the header, location and number of pilot symbol included in the burst) in order to maximize the efficiency of transmission.

More specifically, a longer header or preamble that is included occasionally in a burst (so that it has a negligible impact on the average overhead) is useful to estimate the signal-to-distortion ratio (which does not vary quickly over time as saturation of a terminal's block-up converter only depends on the symbol rate (or the number of OFDM subcarriers in 5G) and power spectral density). Based on the estimated signal-to-distortion ratio, the controller can predict for which transmission power (determined by the transmission bandwidth (determined by the symbol rate or the number of OFDM subcarriers) and the power spectral density) the carrier-to-distortion ratio remains acceptable for the system.

More specifically, for terminals where excessive phase noise (e.g. with a power above a pre-determined limit, said limit typically depends on the used constellation, e.g. 256-QAM is more sensitive to phase noise than QPSK) is detected, it may be decided to send more PTRS symbols to allow better tracking of that phase noise, or it may be decided to change the symbol rate (MF-TDMA) or numerology (OFDM) or move the terminal to another satnet with a higher numerology, as OFDM transmissions with higher numerologies are less affected by phase noise. On the other hand, for terminals where low phase noise is detected, it may be decided to send less or even no PTRS symbols to reduce overhead and thus obtain a better efficiency.

Due to the availability of a powerful MCD structure as above described, a fully flexible MF-TDMA transmission scheme can be proposed, wherein the scheduler or controller device has quasi-full freedom within the time-frequency plane to allocate the required time and frequency resources in the return link to the terminals. Further, in the proposed scheme the frame structure is not bound to be super-frame or frame type oriented, but rather fully adaptive. For a first group of terminals, referred to as a first class, the burst duration (e.g. (602)) is shorter than a frame duration (604) and there is a frame-by-frame based allocation of resources depending on the dynamic needs of the network. This results in finely optimized allocation of the time and frequency resources and maximizes performance. For another group of terminals, referred to as a second class, the burst (e.g. 601) duration is longer than a frame duration. For example, it can be a continuous carrier without specified end time. A transmission scheme is proposed where first class and second class terminals can be serviced in the same satnet, hence they are decoded by the same MCD without reserving dedicated demodulators for the second class demodulators (which is not FPGA resource efficient). More specifically, according to the invention, the MCD architecture (illustrated more in detail in FIG. 11) is such that demodulation does not depend on the duration of the burst, hence also not on whether it is from a first or second class terminal. This is a clear advantage of the present invention over the prior art solutions.

First the assigning of time-frequency resources by the scheduler for the first class of terminals is explained. The return channel scheduling window is defined as a bounded time-frequency frame (604) designed to host efficiently many bursts from first class terminals. More specifically, each such terminal is assigned within a frame one or more dedicated time and frequency areas called bursts (801). In one embodiment a burst can have an arbitrary time duration. In another embodiment a burst can span one or more slots (904) in time, where a slot has a predetermined timing duration, e.g. 5 ms. As already explained in the background section, the resource scheduler or controller allocates return capacity (time and frequency) to different terminals depending on various aspects like signal quality, capacity requests (typically, a terminal expresses an amount of bits it wants to transmit), fairness, service level agreements, etc. The frame duration is a predetermined integer number of time slots, e.g. eight slots. After determining the optimal time-frequency packing of all bursts in a frame by the scheduling algorithm, this configuration info, i.e. the transmit information is signalled to the terminals over the forward link.

Figure 6:
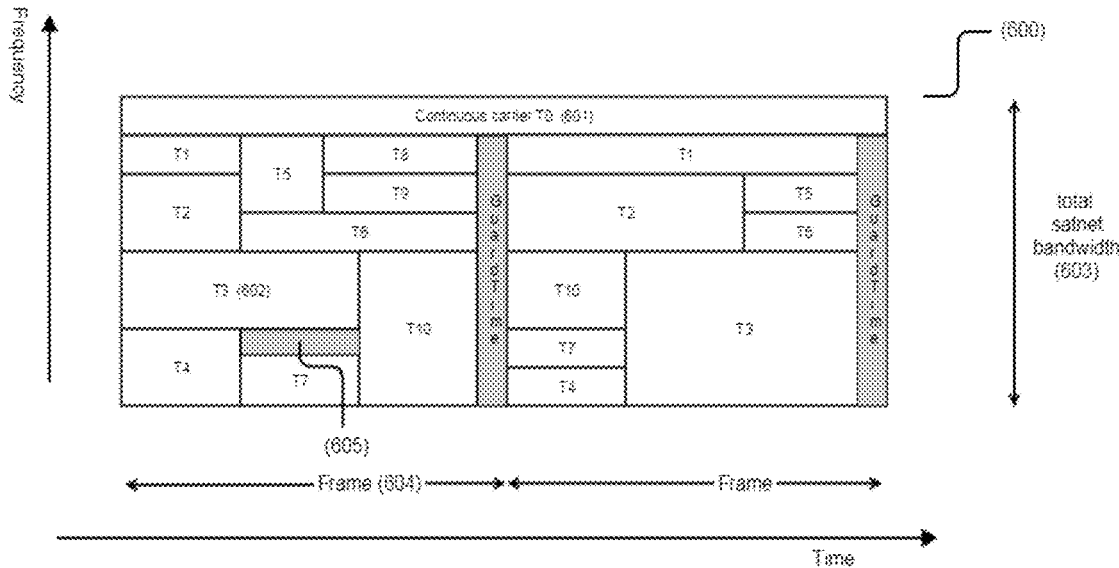
FIG. 6 illustrates a time-frequency plan according to an embodiment of the invention.

The transmission scheme proposed in this invention elaborates on a return link time/frequency frame as shown in FIG. 6, wherein Ti refers to a carrier sent by terminal i. Ti is typically referred to as a burst. The time/frequency plan is optimized on a frame by frame basis for optimal usage of the time and frequency spectrum. Such frames are sometimes also referred to as superframes, e.g. in DVB-RCS2. The unused area in the matrix representation (the gray boxes) in the time/frequency plane should be minimised for optimal efficiency. In addition, the amount of dummy symbols inside the bursts should be minimized as well. Finally, the amount of known symbols (e.g. header and pilot symbols) should be minimized. The finer the frequency and time granularity and the longer a frame, the better the efficiency. To minimize unused portions (605) of the time-frequency plane it is needed to assign portions of the time-frequency plane where there is quasi infinite granularity in one of the dimensions time and frequency. In an embodiment quasi infinite granularity in both time and frequency dimensions can even better service all terminal traffic needs, as explained below. On top of time and frequency grid optimization, terminals receive from the controller a power density and a modulation and coding (modcod) via an adaptive coding and modulation (ACM) algorithm based on their individual link budget, terminal transmit power capabilities and traffic needs. Terminals with large and small capacity demands typically coexist in the same satnet, thus in the same time-frequency frame. Traffic demand for each terminal can change rapidly in a bursty manner. At the end of each frame, a time-frequency plan for the next frame is fixed by the controller and signalled to all relevant terminals such that they can organize their transmission according to that time-frequency plan.

Figure 7:
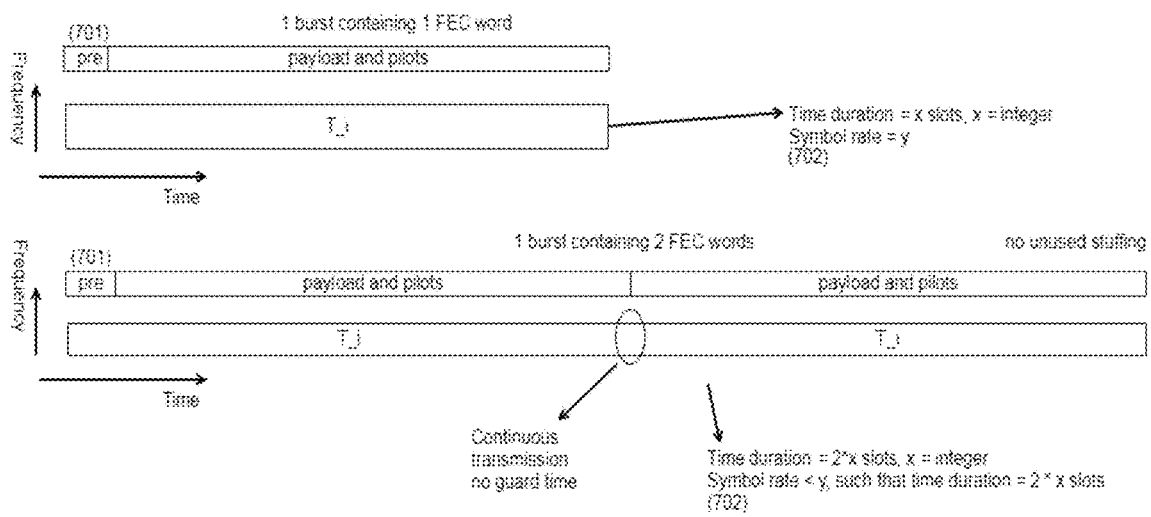
FIG. 7 illustrates why having a large freedom in picking a symbol rate results in avoiding unused stuffing at the end of the burst.
Figure 8:
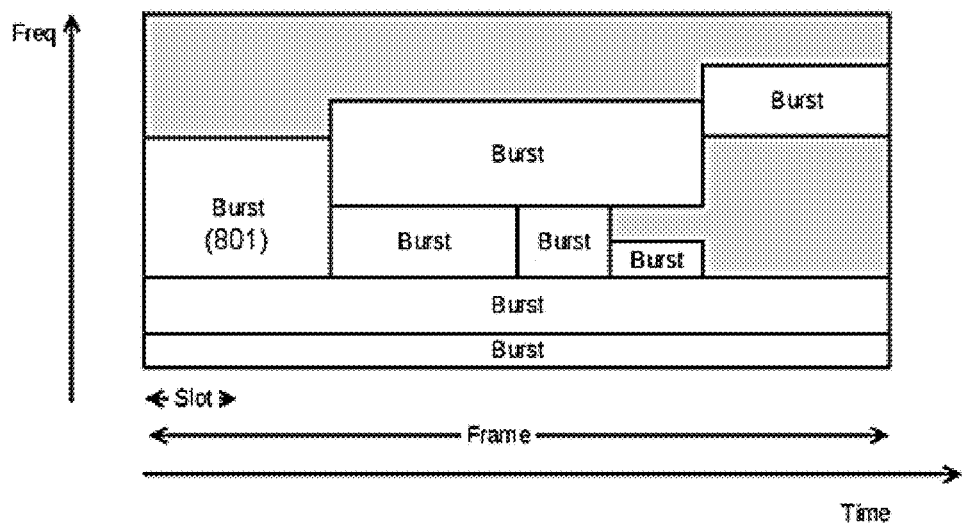
FIG. 8 provides another illustration of a time-frequency plan according to an embodiment of the invention.

Therefore, the time-frequency scheduling as illustrated in FIG. 6 is more efficient in general, as there is almost an infinite frequency granularity. FIG. 7 illustrates why this does not result in unused portions in the time-frequency plane. More specifically, by allowing the symbol rate (702) of bursts to be any value, the symbol rate can be modified such that preamble (701), postamble and payload (corresponding to a multiple of FEC words) and pilot bits always fit perfectly in a burst time duration. FIG. 8 is another illustration of a frame according to the invention illustrating that bursts can have any symbol rate as needed.

At each frame, a time-frequency plan for the next frame is determined. The time-frequency plan can be an arbitrary puzzle with infinite frequency granularity, and in a specific embodiment a time granularity of a slot.

In addition, an infinite time granularity can even better address traffic needs of terminals. Consider for example a case with 100 terminals, where all but two terminals have been assigned to a burst in the time-frequency frame and only a gray area remains with frequency bandwidth equal to the smallest bandwidth allowed for terminals to transmit. The two terminals have the same traffic need, but there are 3 time slots left. In the case of infinite time granularity, each terminal can get assigned 1.5 time slots. The multi-carrier demodulator of the communication system proposed in this invention can handle such infinite time granularity. However, it is a bit more practical for the MCD configuration management to limit bursts to be of a duration equal to an integer multiple of a time slot. The latter case is discussed as well in this description.

Figure 10:
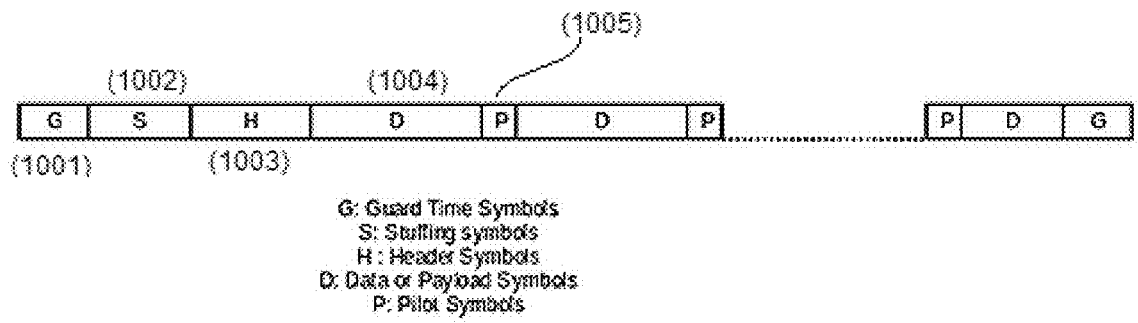
FIG. 10 illustrates the known signal composition in a burst.

A burst for a terminal of the first class of terminals is a time and frequency unit inside a frame assigned to that specific terminal. In one embodiment a burst starts always at a specific slot boundary and can continue across several slots within a frame. For terminals of the second class, the time duration of a burst is longer than a frame. Further, a burst is in general characterized by a centre frequency, symbol rate and start and stop moments. A burst comprises known symbols and data symbols. The location and type of the known symbols results in a known symbol composition in order to make possible a time-multiplexed demodulation, i.e., a demodulation of a burst without the need to first buffer the entire burst. It is an aspect of the invention that this known symbol composition contains the following elements (see FIG. 10):

Start Guard Time Symbols (to account for timing uncertainty)

Header (also called a preamble) for initial acquisition (initial timing, phase, level, and frequency offset estimation)

Payload Data symbols

Pilot Symbols, ordered in pilot groups

End Guard Time

Optional Stuffing for block-up converter (BUC) Power ramp-up (a transient absorbing section wherein transients can be terminal BUC frequency transients due to sudden change in drive power applied by the indoor unit, or terminal indoor unit synthesizer reconfiguration transients). The transient absorbing section has a fixed duration $T_{transient}$. It is possible to conceive a terminal architecture allowing $T_{transient}$ to be near-zero.

Similarly in 5G NR when bursts are transmitted over multiple slots as proposed earlier, the demodulation can start before the complete reception of a burst. The burst comprises OFDM symbols arrangement as standardised by 5G NR for different subcarrier spacings and bandwidths DMRS symbols for acquisition and synchronisation are inserted in first transmission slot PTRS symbols spanning over the full transmission allowing the tracking of carrier phase variations in the receiver, where the number of PTRS symbols can be made dependent on the communication link quality Payload OFDM symbol carrying the encoded payload data. This segment can be composed of one or multiple FEC words.

Time-multiplexed demodulation of a burst (without buffering the complete burst) requires a known symbol composition that allows synchronisation which does not need the complete burst before outputting the first symbols of payload data. In the approach of this invention, it is chosen to send a preamble (1003) and not a postamble (as this postamble is not available anyway for most of the segments of a burst, processed before the end of the burst is available). A preamble is sent once in a burst, while pilot symbols (1005) typically are distributed over the entire burst. The frequency offset, channel gain (level and phase) and time-offset are estimated on the header inside the preamble and further fine-tracked by a matched filter (1104) and phase tracker (1105) over the entire burst.

The header or preamble (1003) must be located at the beginning of the burst. The acquisition block (1103), which is responsible for detecting which sample in a segment is the first sample of a burst, in order to detect a frequency offset and a phase offset of a burst, cannot make use of other pilot symbols (1005) distributed in the burst for initial acquisition. Time-multiplexed demodulation is not possible when acquisition algorithms are used that employ the complete burst. In a 5G context this means the first transmission slot must contain DMRS overhead allowing for channel estimation and tracking on the burst. For the following slots only phase and level tracking is typically required as the timing drift is much lower than the carrier phase and frequency drift.

For further phase tracking, the pilot distribution is such that the phase tracking loop never needs pilot symbols located further away in the burst (which would require buffering of more symbols). For this, the pilot groups in the burst are kept as short as possible (as short as 1 symbol for moderate and high SNR). A rule of thumb is that the correlation of a received pilot group with the transmitted pilot group results in a total SNR after correlation of 15 dB to avoid phase ambiguity on the phase estimation (i.e., the phase error is larger than $2\pi$ rad). Hence, if the communication channel SNR is higher than 15 dB, pilot groups can be as short as 1 symbol. If the communication channel SNR is higher than 12 dB but smaller than 15 dB, pilot groups can be as short as 2 symbols, and so on. For each pilot group, a phase estimation is performed. Phase tracking is performed using a second order loop filter. At a certain moment in time, the phase correction is based on current second order filter state. Each time a new pilot group is available, the estimation error is fed to the loop and the loop state parameters (phase and frequency) are updated.

In case a burst is buffered completely, an alternative approach would be to store the complete burst and then combine all the pilots power for optimal phase and frequency estimation. The latter approach is more optimal in terms of estimation quality, but does not allow time-multiplexed demodulation.

The required pilot symbols overhead (e.g. PTRS symbols in the case of 5G) depends on expected signal-to-noise ratio and the present phase noise (which depends on the symbol rate or on the numerology (the subcarrier frequency bin size) in the case of 5G). The pilot group periods and sizes are optimised individually for each signal-to-noise ratio operation point and symbol rate. The higher the signal-to-noise ratio, the shorter the pilot groups can be, so more pilot symbols can be distributed over the burst for a constant number of pilot symbols, which results in better phase tracking (i.e., more frequent updating of the second order filter loop state).

As already mentioned, a carrier from a terminal is denoted a burst.

A 'frame' is subdivided in slots (904).

Figure 11:
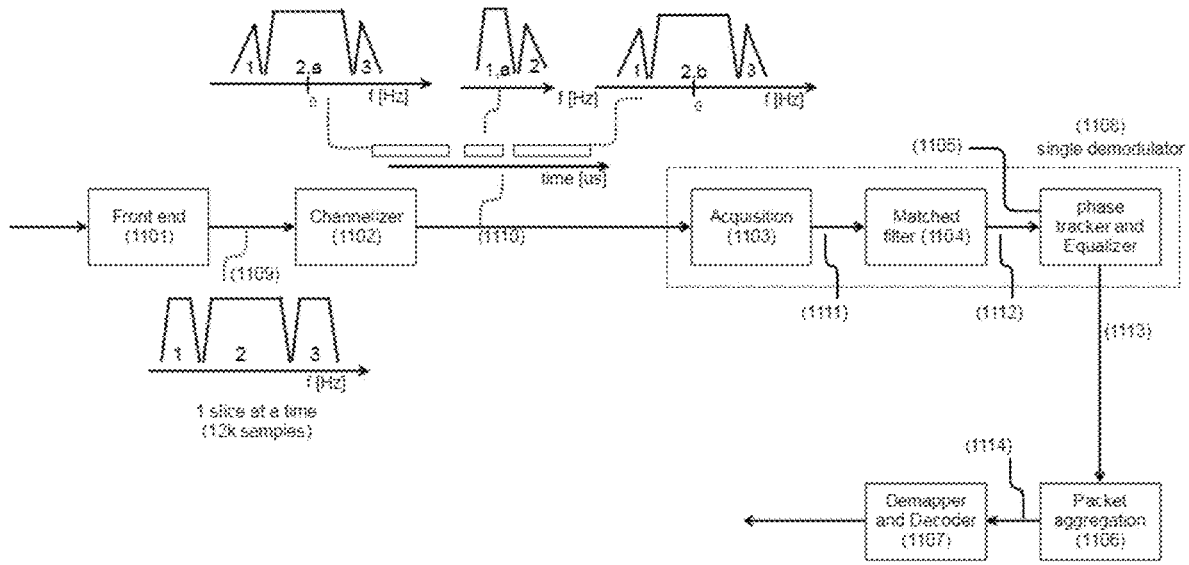
FIG. 11 illustrates a single MCD device in an MCD structure and how it processes a resulting signal to decoded FEC words.

Reference is made to FIG. 11. As already mentioned, an MCD structure with parallel demodulators cannot scale to 1024 carriers to be demodulated. On the other hand, storing bursts is impossible for jitter reasons. Below, an MCD structure is described which can handle both 1024 carriers as well as long bursts.

A front-end circuit (1101) converts the incoming waveform or the so-called resulting signal (104) to a sequence of digital samples (1109), also referred to as a version of the resulting signal, at an acceptable centre frequency close to 0 MHz. This is followed by a channelizer (1102). The problem domain of channelization is well understood, see e.g. U.S. Pat. No. 8,831,121B. The role of the channelizer is to downsample and serialize slices (905) of a receive signal at the ADC sample rate into multiple sample segments (1110) corresponding to parts of carriers or bursts at a suitable oversampling rate (samples/symbol) for subsequent demodulation and decoding effort.

Figure 9:
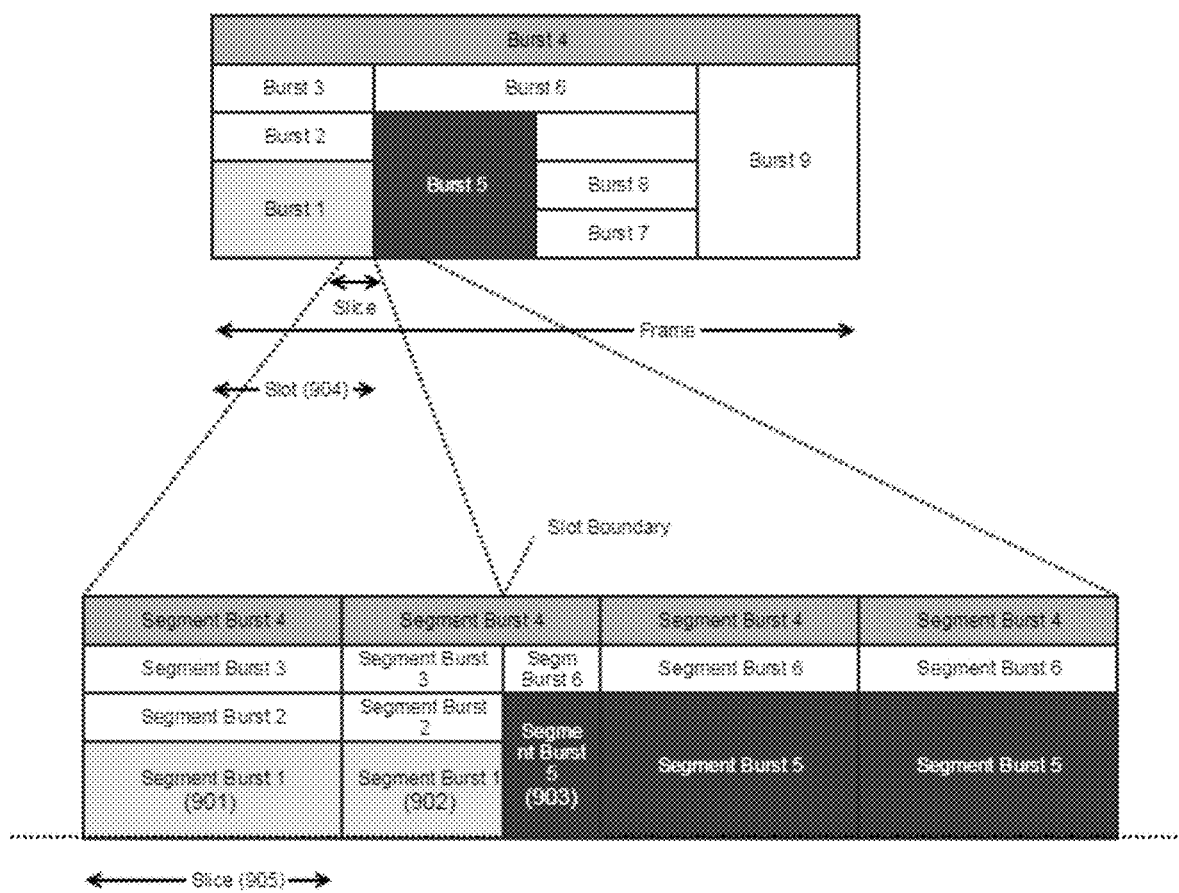
FIG. 9 illustrates the subdividing the time in slices and the subdividing of bursts in segments according to the bursts and the slices, also illustrating that a segment can have a shorter duration than a slice at the end or start of a burst.

The time dimension after the channelizer is subdivided in slices (905), containing multiple sample segments (901), as shown in FIG. 9. Slice boundaries are not coinciding with slot boundaries. A channelizer has to bandpass filter all carriers in an efficient way. A channelizer typically performs the bandpass filtering in the frequency domain by first applying an FFT, then filtering in the frequency domain and then applying an IFFT. A 'slice' refers to a sequence of samples that can fit in one FFT operation (the size of the sequence corresponds to the FFT size N—overlap section size). Its time duration depends on the sample rate, the FFT size and the overlap size. An exemplary FFT size is N=16 k and a corresponding overlap section spans 4 k samples. Hence, 12 k samples at a sample rate of roughly 166 MHz yield a time duration of 72 µs.

Figure 15:
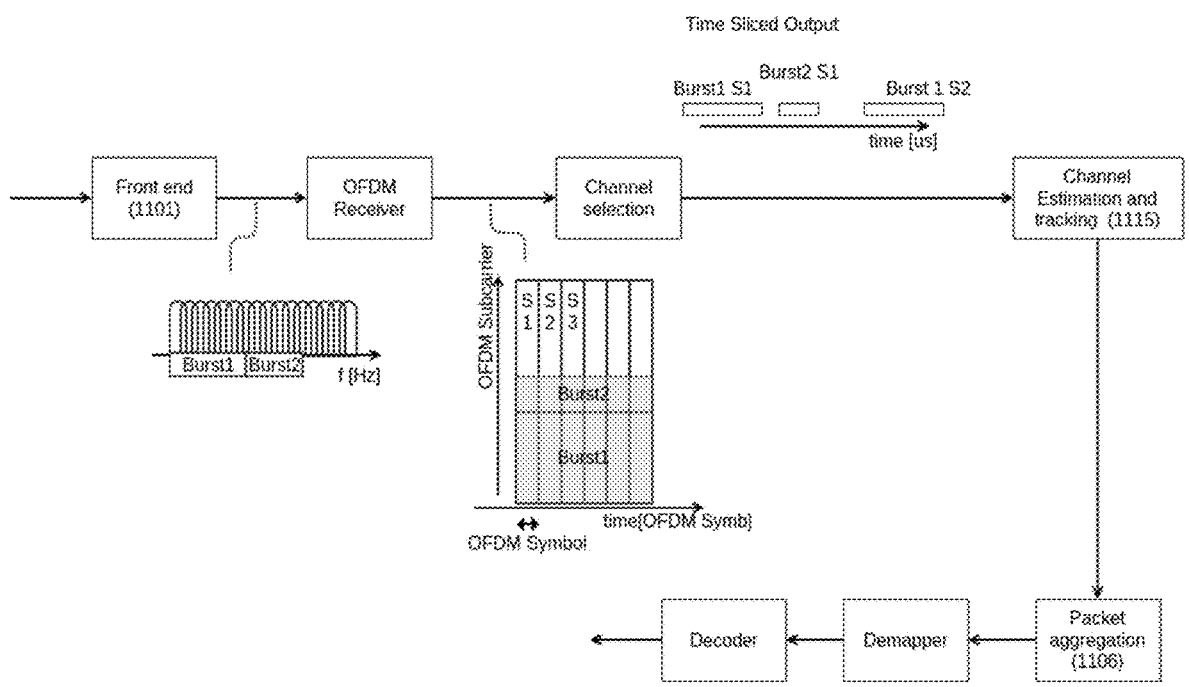
FIG. 15 illustrates an embodiment with pre-FEC word aggregation of symbols and where physical layer waveform is an OFDM waveform.

In the 5G NR or any OFDM waveform context, the channelizer is replaced by an OFDM receiver and time synchronisation as illustrated in FIG. 15. In some embodiments of the communication system a channelizer and an OFDM receiver can coexist, so that the system is arranged both for TDMA and OFDM. The OFDM receiver isolates the different OFDM subcarriers via an FFT. In that sense the OFDM receiver also performs a 'channelization'. The notion of time slice detailed previously can now be referred to as one or more OFDM symbols. One OFDM symbol is composed of an array of subcarrier symbols. Each subcarrier is modulated using any constellation (QPSK, N-QAM, Multi-ring-APSK, . . . ). The OFDM receiver aggregates multiple OFDM subcarriers associated to a terminal burst transmission to a symbol segment. The symbol segments are processed in a time multiplexed way for tracking and demodulation. For each receive signal associated with a terminal burst transmission the symbol segments corresponding to a FEC word can be aggregated and decoded as soon as a complete FEC word is received.

A 'sample segment' (901) refers to a portion of a slice in the frequency domain. Hence, a sample segment has the same time duration as a slice but a smaller frequency bandwidth. There are two exceptions to this. A sample segment at the end of the burst can have a shorter duration than a slice duration if the slot boundary does not coincide with the slice boundary, which is typically the case. As a consequence the sample segment at the start of the next burst is also shorter. This is clearly illustrated in FIG. 9, where the sample segments at the end of bursts 1 (902) and 2 are shorter, as well as the first sample segment of burst 5 (903) which starts after bursts 1 and 2. Hence, a sample segment can only contain samples from a single burst situated within the corresponding slice. Due to the requirement to channelize a signal with possibly more than 1000 carriers, the goal is to output each sample segment in a serial way, hence, one after the other (1110). The channelizer thus has a single output. E.g. in the presence of three parallel carriers, the channelizer first outputs a sample segment for a first carrier (e.g. sample segment 2,a in FIG. 11), then a sample segment for a second carrier (sample segment 1,a in FIG. 11), and finally a sample segment for a third carrier. (sample segment 2,a in FIG. 11). Then, a second sample segment for the first carrier (sample segment 2,b in FIG. 11) can for example follow. This allows for a single demodulator (1108) processing segment per segment instead of parallel demodulators.

A 'slot' (904) is the minimum time duration of a burst. In a particular embodiment in which a burst always spans an integer number of slots and always starts on a slot boundary, it is the minimum time duration that the time-frequency plan for the receive signal remains unchanged; or, put differently, the earliest time where the time-frequency plan can change. For example, in the case of supporting at most 1024 carriers, the latter is the same as saying that, in each slot, at most 1024 bursts can be present in the receive signal; no new bursts start in the middle of a slot.

Hence, at the receiver side, in this particular embodiment, the channelizer is reconfigured by the controller for each slot, such that it can separate all bursts in the receive signal into separate sample segments at its output. More specifically, the controller signals for each burst in the slot, referred to by an ID, a central frequency and a symbol rate, a start time and a stop time. As such, the channelizer can filter out those bursts at a particular oversampling rate. In a particular embodiment the time slot duration is 5 ms.

Care needs to be taken when the controller writes said configuration and the channelizer reads said configuration. To avoid the same memory address being written and read, the channelizer configuring by the controller occurs as follows. The configuring is written in a logical table with 1024 rows and 2 columns (in hardware, this logical table is typically implemented using two separate memories, one for each column). The software is reading the configuration of the slot in which the present receive signal belongs. This configuration is in one of the two columns. At that moment, the other column is freed by the hardware for software configuration. That is, once the channelizer starts reading from a column, it frees the other column. A slot takes 5 ms, so the software has 5 ms of time (the slot duration in a particular embodiment) to configure the other column with the configuration for the next slot. The configuration typically takes quite less than 5 ms. Once the receive signal corresponding to the next slot is processed, i.e., the channelizer starts reading from the other column, the first column is freed by the hardware for software configuration such that the software again has 5 ms of time to configure the first column with the configuration for the subsequent slot, etc.

Slot boundaries are not coinciding on a slice boundary. This means that within a slice, it is possible that a burst ends and a new burst starts. With the mechanism explained before, this is not a problem as the configuration for the next slot is already configured by the channelizer before the end of the current slot, i.e., the channelizer just starts processing the other column with the configuration for the next slot.

For a particular burst, the outputted sample segments are in the correct order of course. The channelizer also includes an identifier, referred to as a config ID, per sample segment as a signalling for the subsequent blocks in the demodulator. The config ID allows each subsequent block to
- load the correct state (more on state loading and saving is explained below) corresponding to the burst in the segment if needed (see below)
- set the correct parameters corresponding to the burst symbol rate, start and stop time, central frequency, etc.
- save the correct state at the end of its processing if needed (see below).

The matched filter, phase tracker and equalizer only have to load and save a state once every segment. For example, for the last segment of burst 1 (902) in FIG. 9, a state has to be loaded at the start of the segment, but not saved at the end of the segment as it is the last segment of the burst. For the first segment of burst 5 (903), no state has to be loaded at the start of the segment as it is the first state, but a state has to be saved at the end of the segment. This config ID can thus be a number between 0 and 2047 in a particular embodiment. For example, the first 1024 configuration IDs refer to the bursts in a slot and the last 1024 configuration IDs refer to the bursts in the next slot. For the next blocks, just like for the channelizer, the software configures a column of a table once this column is freed by the hardware, i.e., when the hardware is processing the other column. Each row of the column contains information for the corresponding config ID. Thus, based on the config ID that is attached to at least a segment, the block can fetch this information from the table written by the software. For 5G NR CP-OFDM reception, the need of an accurate timing recovery is alleviated if transmission time uncertainty is smaller than CP duration. The matched filter, phase tracker and equalizer are typically replaced by a channel estimator function. The OFDM channel estimator (1115) performs phase and magnitude estimation per subcarrier and applies correction to the whole burst (OFDM subgrid). In time sliced operation the channel estimator and tracking function is subject to a similar state save and restore operation to keep the updated estimation in each slice and apply the proper corrections to each slice.

In a preferred embodiment the oversampling rate (samples/symbol) is fixed, with a value between 1.2 and 1.8, depending on the implementation (e.g. depending on the roll-off used by the transmit burst signals, or depending on the amount of clocks needed to load and save states of the demodulator blocks. The oversampling rate should not be too high to avoid the need for too high a FPGA clock rate in order to be able to process all sample segments in a timely manner. It should also not be too low to ensure that the useful carrier of interest, including a frequency-offset uncertainty, is not distorted by the channelizer filtering. To perform its task, the channelizer receives from the controller a description of the resulting signal from the one or more receive signals corresponding to said one or more transmit burst signals of said plurality of terminals, with an aggregate occupied bandwidth smaller than or equal to said given total satnet bandwidth. The description sent from the controller can include end times of bursts, start times of new bursts, symbol rate and centre frequency of all bursts. In a preferred embodiment, this description is sent every slot in order to avoid that the channelizer has to store all this information. Based on the present invention, the channelizer can configure multiple filters to filter out and decimate each of the bursts from a version of the resulting signal obtained after processing by the tuner and analog-to-digital converter, to a desired oversampling rate, for example a value between 1.2 and 1.8 times the symbol rate of the burst.

In the prior art approaches, like e.g. in U.S. Pat. No. 8,831,121B, samples at the output from the channelizer are buffered until a complete burst is present, which is the provided to the demodulator processing that burst.

Here, thanks to the measures taken (e.g. a fixed oversampling rate, well placed overhead, a fixed set of coefficients used to pulse shape the transmit burst signals (explained below)), the following architecture allows demodulating a burst segment by segment. That is, each segment is provided to the demodulator without the need to first buffer a complete burst.

More specifically, an acquisition unit buffers sample segments until a complete header (a sequence at the start of each burst) is present, which allows determining a phase-offset, frequency-offset, timing offset and level for that burst. More specifically, each sample segment contains an identifier, added by the channelizer, identifying to which burst a sample segment belongs. Based on the receive information provided by the controller to the acquisition unit, the acquisition unit knows, for each burst, which sample segments it has to aggregate such that the preamble is guaranteed to belong to the aggregated sample segments. The aggregated sample segments are used to determine the timing offset, frequency offset, level and phase offset of the burst. This comprises for example a correlation with a set of versions of a stored preamble sample vectors. The preamble sample vector can be fetched from a dedicated RANI memory based on the configuration ID number. Typically, only a small number preamble types are used. For example, preambles of length 16, 32, 64, 128, 256, 512, 1024, and 2048 symbols are selectable to be included in a transmit burst signal by a terminal. In another embodiment 32 different preambles are selectable. Given that the roll-off of the square-root raised cosine pulse-shaping filter used by the terminals for composing a transmit burst signal is constant, e.g. equal to 2% or equal to 5%, and given that the oversampling rate is constant, results in a small number of preamble sample vectors to be stored in the acquisition unit. The preamble sample vector is the result of pulse shaping the corresponding preamble symbol vector with the fixed oversampling rate and with said constant roll-off factor.

The versions of a stored preamble sample vector correspond with applying a frequency offset to set stored preamble sample vectors. Each version corresponds with another frequency offset hypothesis. The version of the stored preamble sample vector yielding the highest correlation value with a set of time shifts of the aggregated sample segments, indicates the estimated frequency offset (corresponding to set version) and timing offset (corresponding to said time shift). The level and phase of the highest correlation value indicates the level and phase offset of the burst.

Summarizing, thanks to the constant roll-off applied by the terminals in their pulse shaping filters and the constant oversampling rate applied by the channelizer, an acquisition unit only has to store a limited number of preamble sample vectors, which does not occupy a lot of memory (e.g. in the order of 50 kbit) and which does not require time or FPGA resources to generate this preamble sample vector (as it simply has to load this vector from said memory).

After estimating the level, phase offset, frequency offset and timing offset, the acquisition unit simply includes those estimates to one or more sample segments of the corresponding burst to the next block in the single demodulator, together with forwarding the sample segments (1111) themselves.

The skilled person readily understands a trivial extension is to use two possible roll-off factors to pulse-shape the transmit burst signals, for example. The receive information from the controller then also specifies the roll-off factor for each of the configuration ID numbers, such that the acquisition unit can fetch the correct preamble sample vector (i.e., pulse-shaped with the correct roll-off factor) from the dedicated RANI (which in this case has a length twice that of the implementation with a single roll-off factor). A similar extension can be done to three or more roll-off factors. The RANI to store all possible preamble sample vectors thus gets larger, but the invention is clearly not limited to a single roll-off factor, although it is the preferred embodiment.

Furthermore, other pulse-shaping filters exist than square-root raised cosine filters. Indeed root raised cosine (RRC) filters occupy a lot of resources, have a high PAPR which limits non-linear saturation. Some intersymbol interference is always manageable, so a system implementation does not need to be limited to free ISI pulse-shaping and matched filtering. Other pulse-shaping filters such as partial response filtering exist, see for example US2017/207934. Many windowing techniques exist to window a given filter, such as a Hamming window or a Kaiser window. The present invention is not limited by the pulse shaping filter type used. The parameter "roll-off" can therefore be generalized to a set of parameters. Each of the parameters in the set of parameters can take-on values. The collection of different value combinations determines the amount of different pulse-shaping filters that are possible. The cardinality of this collection is defined as the amount of different value combinations (or the number of coefficient sets) configurable to pulse-shape the transmit burst signals in the terminals. The RAM size storing the sample preamble vectors is proportional to this cardinality. In a preferred embodiment of the system according to the invention a collection of only one value combination is used, thus with a cardinality 1. However, the invention is not limited to this.

Alternatively, the symbol filter can be removed completely. This typically results in a wider frequency band usage. However, in OFDM waveforms where no symbol filter is used, the wider frequency usage per subcarrier is not a problem as the various subcarriers remain orthogonal after reception when properly spaced. So, in OFDM the usage of a matched filter is optional.

Next, the matched filter (1104) processes sample segment per segment (1111) with the goal to output the symbols (1112) corresponding to the samples in the incoming segment. The matched filter block has two main tasks. Firstly, the input signal is matched filtered maximizing the signal-to-noise-ratio, by simply low pass filtering perfectly around the signal bandwidth so filtering out all out-of-band noise components. Secondly, the output signal from the matched filter is resampled at the optimal symbol times (so minimizing the inter symbol interference as is well known in the art). In CP-OFDM, the timing alignment is obtained for the whole group of terminals. Timing alignment mismatches between the different terminals are handled with the cyclic prefix. Timing errors within the cyclic prefix do not cause any intersymbol interference.

For properly matched filtering and resampling, both the symbol times and the symbol rate are needed as input parameters to the matched filter block. The symbol time is estimated by the acquisition unit and the symbol rate is typically known with good accuracy (a relative accuracy of $10^{-5}$ due to clock uncertainties and/or Doppler effects is typical) in the demodulator. Both values are used for initialization of the matched filter.

A symbol time offset is, over time, a static offset of the symbol time. A symbol rate offset results in a gradual constant increase of the symbol time offset over time. For short bursts (around 1000 symbols), the initial time and symbol rate can be used over the complete burst. For longer bursts the timing error drift due to symbol rate inaccuracy and some tracking is required. For example, with a $10^{-5}$ symbol rate accuracy, the time estimation has drifted from the actual symbol time by a complete symbol time after 100000 symbol times. The timing loop is typically a second order loop bringing to zero the output error for a static symbol time offset as well as for a gradual increase of the symbol time offset (due to a symbol rate offset).

In a particular embodiment the matched filter timing error estimator is typically a non-data aided estimator (i.e., it is not making use of the known pilot symbols). A lot of possible timing error estimators are presented in literature. A Gardner estimator is a typical solution. This and other timing error estimators have extensively been described in the literature. The satellite communication system of the invention is not limited by a particular timing estimator.

The configuration parameters of the matched filter are relatively simple. These include the symbol time, the symbol rate and the second order loop control parameters. The state register is more elaborated. It includes all the matched filter taps, the tracked time and symbol rate and other hardware pipe-lining registers. The complete state vector can go up to approximately 3.5 kbit per state vector, e.g. for a 2% roll-off square root raised cosine matched filter. The matched filter output is referred to as a first version of symbol segments (1112), which are demodulated sample segments.

Finally, a phase tracker and equalizer removes a remaining phase and frequency offset on the symbols. The output of the matched filter provides a properly sampled symbol stream, i.e., the symbol segments (1112). The symbols in the first version of symbol segments are time aligned, but there can be a residual phase and frequency offset error. A scatter plot (i.e. a 2-dimensional plot stacking the I and Q values of the symbols on the x and y dimension, respectively, on top of each other) shows points with a phase offset and slowly rotating. The goal of the phase tracker function is to correct these residual phase and frequency errors, yielding a second version of symbol segments (1113), in short, symbol segments.

Just like with the time offset in the matched filter, a phase offset is a static offset over time, while a frequency error results in a gradually increasing phase offset over time. The phase and frequency errors are initially estimated by the acquisition unit estimations. However, further tracking is mandatory because of further phase drift during the burst due to acquisition unit imperfect estimations of the carrier frequency and due to carrier phase noise.

The carrier phase estimation can be data aided (based on the pilot symbols) or non-data aided (based on payload symbols). In both cases the measured phase errors are fed to a second order control loop to control the carrier phase. Similarly to the matched filter, a second order loop can track both the phase error and the carrier frequency error. The phase tracker outputs symbol segments. At that moment, symbols are buffered in a pre-FEC word aggregator (1106) until all symbols corresponding to a single FEC word are present. These aggregated symbol segments (1114) are then provided to the demapper and decoder (1107). Depending on the achievable throughput of the demapper and/or decoder, it can be that there is more than one demapper and/or decoder to process the aggregated symbol segments.

In the past, it was deemed very difficult or impossible to read and write the state of a demodulator block in a few FPGA clock cycles. Recall that for example a matched filter processing a burst in chunks, more specifically, in segments, needs to keep track of its filter buffer for example. A matched filter in a time-multiplexed demodulator can potentially process in one embodiment 1024 segments in each slot, which is 5 ms in a particular embodiment. A matched filter state can be in the order of 3.5 kbit. The total state of all parallel carriers amounts up to an order of 3.5 Mbit, just for the matched filter. Other processing blocks such as the equalizer and the phase tracker also have states to save. Conventionally, such state management was done through a larger external memory, such as a Double Data Rate Synchronous Dynamic Random-Access Memory (DDR SRAM), which has a limited writing and reading speed, e.g. 32 bit per clock. Thus, it would already take 110 clocks to just load a state, and 110 to save it, not even mentioning all the other blocks that have to reach this DDR too. Hence, larger block RAMs or external SRAM memory chips can store a lot of data but never allow very high bandwidth parallel transfer of data.

The solution of this invention is to use instead a high number of distributed block RAMs. Each RAM is rather limited in memory, for example it has 1024 rows and a bit width of 9 bit, so it can store about 9 kbit of memory. However, one can write immediately 3.5 kbit to 389 parallel RAMs, say, in a few clock cycles. For example, the Altera Stratix IV FPGA family hosts M9K blocks which allows implementing the invention.

Above, preferred embodiments of the system according to the invention were explained. It is advantageous that the system allows saving and loading states in a few number of clocks using dedicated distributed RAMs, such that blocks like a matched filter can process a burst in segments. It is also advantageous that the system aggregates segments belonging to a single FEC word, instead of aggregating segments belonging to a complete burst, which can span 1000s of FEC words and which would cause too much jitter when doing so. It is also beneficial that the system of the invention fixes the oversampling rate and that it uses one or a few roll-off factors such that the preamble sample vector can be pre-stored. It is also beneficial that there is a preamble such the first segments allow acquiring the burst. It is advantageous that the controller can choose any symbol rate for the transmit burst signals, such that the transmit burst signals always span an integer number of time slots without having unused areas in the time-frequency frame. Due to spanning an integer number of time slots, it is sufficient that the controller signals, in a particular embodiment, 1024 configurations per time slot. Avoiding empty areas in the time-frequency frame improves the efficiency. It is important that the controller can allocate bursts that span a longer time than a frame duration, without reserving a dedicate demodulator for that in the MCD, as the MCD processes bursts anyway segment by segment.

In the description above, the pre-FEC word aggregator aggregating segments belonging to a single FEC word is situated before the demapper and decoder. A person skilled in the art knows that variations exist of the preferred embodiment explained above. In fact, it is essential that there is a pre-FEC word aggregator aggregating segments belonging to a single FEC word, but this pre-FEC word aggregator can be situated anywhere between the matched filter and the FEC decoder. For example, the pre-FEC word aggregator can be situated after the demapper and before the decoder. Alternatively, it can be situated immediately after the matched filter or after the phase tracker and before the equalizer. It is well-known that the phase tracker can also be before the matched filter. Also, the equalizer can be before the matched filter. Similarly, the acquisition unit or part of it could also be after the matched filter. Clearly, the invention covers all these variations of orders of the demodulator blocks.

Figure 12:
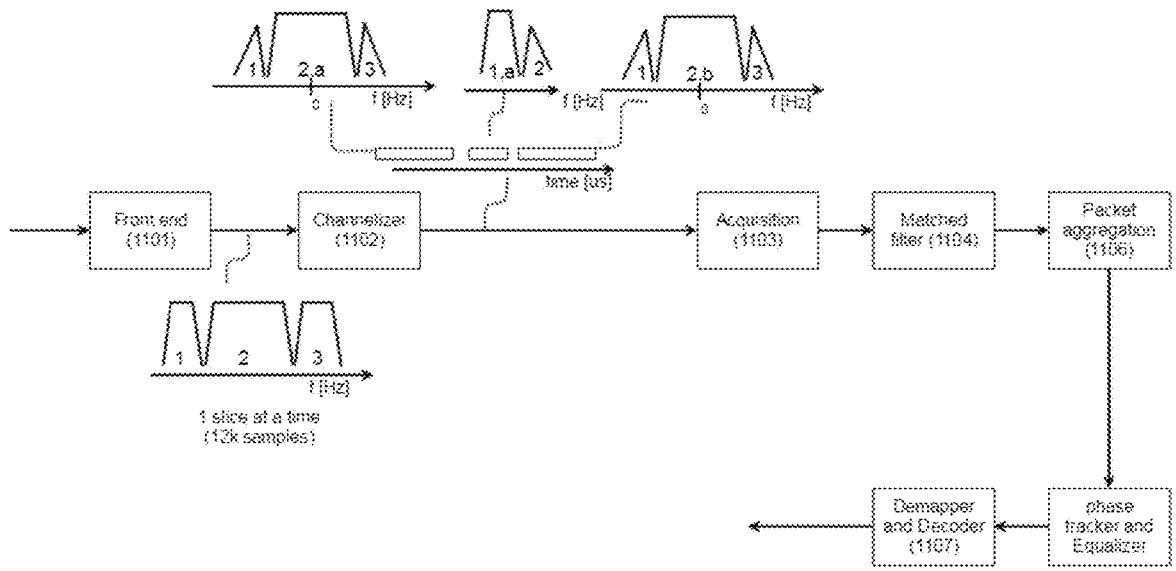
FIG. 12 illustrates an embodiment where the pre-FEC word aggregator is located immediately after the matched filter, followed by a phase tracker and equalizer and demapper and decoder.
Figure 13:
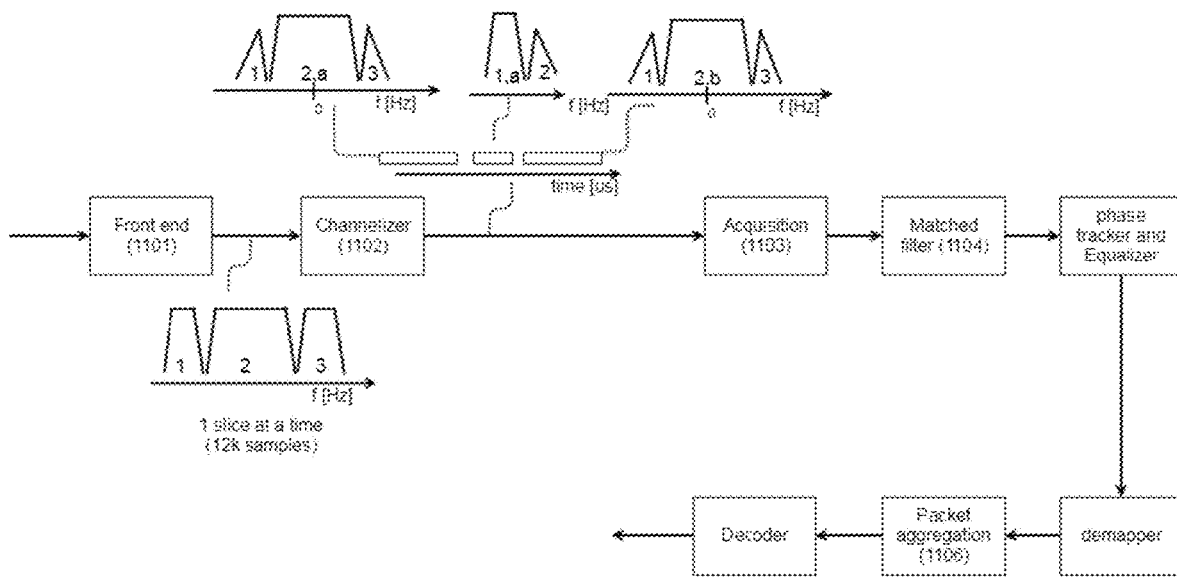
FIG. 13 illustrates an embodiment where the pre-FEC word aggregator is located after the demapper.

FIG. 12 illustrates such an embodiment where the pre-FEC word aggregator is located immediately after the matched filter, followed by a phase tracker and equalizer and demapper and decoder. FIG. 13 illustrates another embodiment where the pre-FEC word aggregator is located after the demapper. FIG. 15 shows another embodiment where FEC word aggregation is done before the decoder and the modulation is OFDM.

Figure 14:
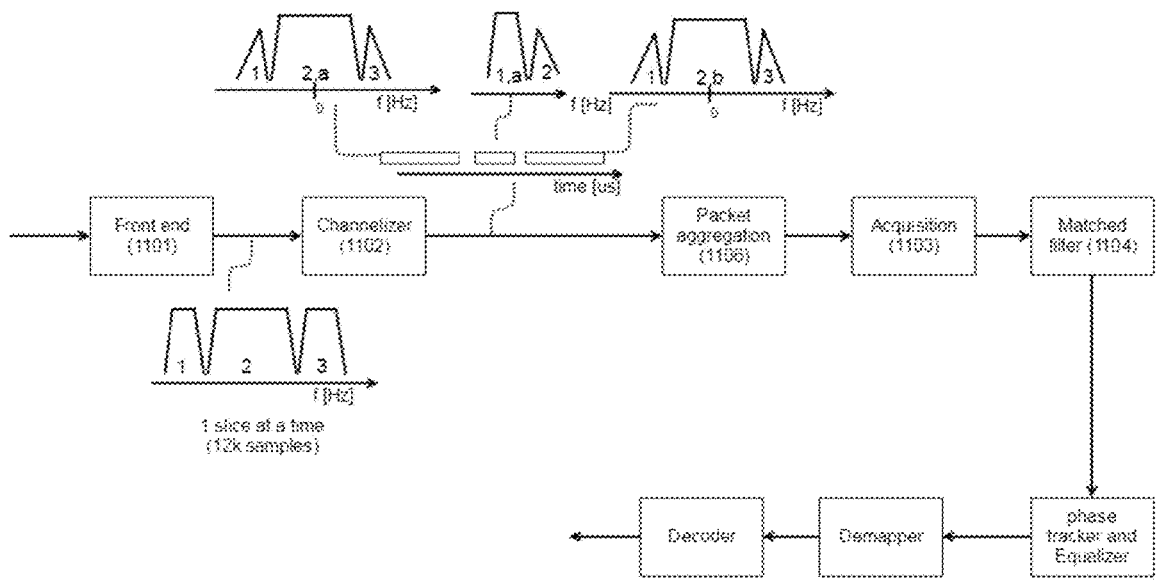
FIG. 14 illustrates an embodiment where the pre-FEC word aggregator is located after the channelizer.

A more significant variation is to put the pre-FEC word aggregator before the matched filter. Before the matched filter, sample segments are present. On the transition between 2 FEC words, sample segments exist which contain samples that are a function of symbols belonging to said 2 FEC words. This can be understood from the operation of a pulse-shaping filter. An output sample of a pulse-shaping filter is a weighted combination of, say, 32 symbols. The weights are the filter coefficients. It may well be that the left 16 symbols are the result from the mapping from a FEC word and the right 16 symbols are the result from the mapping from a previous FEC word. Hence, the output sample is a function of symbols coming from 2 FEC words. Hence, certain sample segments "belong" to 2 FEC words. As a consequence, the packet aggregation is more complicated as some sample segments will need to be stored in special memory to be inserted in 2 "aggregated sample segments". This also lowers the maximum throughput after the pre-FEC word aggregator. So it is not the preferred embodiment of the invention but the invention does not exclude this. A similar embodiment is to place the pre-FEC word aggregator after the channelizer and before the acquisition unit. FIG. 14 illustrates another embodiment where the pre-FEC word aggregator is located after the channelizer.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system for communication via satellite between a gateway and a plurality of terminals comprising:
    a controller device arranged to calculate a time-frequency plan of one or more transmit burst signals from at least one terminal of a satellite network, satnet, with a given total satnet bandwidth and to transmit information to each terminal of the at least one terminal based on the calculated time-frequency plan in order to allow the terminal to transmit a transmit burst signal comprising one or more forward error correction words, said transmit information for a first class of terminals comprising configuration information on one or more transmit burst signals so allowing the terminal of the first class of terminals to transmit the one or more transmit burst signals in a frame, each transmit burst signal being configured with the configuration information and having a time duration less than or equal to a duration of said frame,
    a multi-carrier demodulator structure arranged to receive a resulting signal comprising one or more parallel receive signals corresponding to the one or more transmit burst signals of the at least one terminal of the satnet, said resulting signal having an aggregate occupied bandwidth less than or equal to the given total satnet bandwidth, and arranged to receive from the controller device receive information for the one or more parallel receive signals, said multi-carrier demodulator structure comprising
    a channelizer to serialize slice-by-slice the one or more parallel receive signals at an output rate greater than or equal to the given total satnet bandwidth, wherein a slice is formed by a predetermined number of samples of the resulting signal, yielding a serialized stream of one or more sample segments corresponding to the one or more parallel receive signals, said sample segments referring to a slice portion in the frequency and time domain
    a processing block arranged to receive the serialized stream of one or more sample segments and arranged to perform
    segment-by-segment demodulation of the sample segments based on the sample segment content, on a state indicative of the receive signal to which the sample segment belongs and on the receive information
    pre-FEC word aggregation,
    demapping and decoding,
    wherein the demodulation comprises matched filtering on a segment-by-segment basis, yielding a stream of symbol segments, and
    wherein the pre-FEC word aggregation comprises aggregation of symbol segments of the stream which belong to a single forward error correction word.

2. The system for communication as in claim 1, wherein the processing block comprises:
    a single demodulator arranged to receive the serialized stream of one or more sample segments and arranged to, segment-by-segment, demodulate the sample segment based on the content of the sample segment, on a state indicative of the receive signal to which a sample segment belongs and on the receive information, yielding a serialized stream of symbol segments,
    a pre-FEC word aggregator arranged to aggregate symbols of the serialized stream of symbol segments which belong to a single forward error correction word of the one or more forward error correction words,
    a demapper and decoder arranged to demap and decode aggregated symbols received from the pre-FEC word aggregator.

3. The system for communication as in claim 1, wherein the controller device is arranged to transmit at least once transmit information for a second class of terminals of said plurality,
    wherein the transmit information for the second class of terminals comprises information on a transmit burst signal including one or more of a start time, a central frequency, a symbol rate and a number of forward error correction words, so allowing a terminal of the second class of terminals to transmit the transmit burst signal having a time duration greater than a frame duration.

4. The system for communication as in claim 1, wherein the controller device is arranged to calculate the time-frequency plan taking into account one or more of: a request for transmission for the first class of terminals, a service level agreement and information related to fairness and signal quality.

5. The system for communication as in claim 1, wherein the receive information comprises one or more of a start time, a central frequency, a symbol rate for each of the one or more receive signals.

6. The system for communication as in claim 5, wherein the channelizer is arranged for downconverting and decimating the one or more sample segments using the central frequency.

7. The system for communication as in claim 6, wherein the channelizer is arranged for performing the decimation at a fixed oversampling rate with respect to the symbol rate.

8. The system for communication as in claim 1, wherein the time duration of the transmit burst signal of each terminal corresponds to an integer number of slots.

9. The system for communication as in claim 1, wherein the channelizer is arranged to attach a configuration ID number to the one or more sample segments.

10. The system for communication as in claim 1, wherein the transmit burst signal comprises a preamble and a plurality of groups of pilot symbols, the size of the groups being related to the communication link quality.

11. The system for communication as in claim 1, wherein the processing block comprises an acquisition unit, a matched filter, a phase tracker and an equalizer.

12. The system for communication as in claim 11, wherein the acquisition unit is arranged to aggregate sample segments to which the preamble belongs based on the receive information and the configuration ID number, to load a portion of the state indicative of the receive signal to which the preamble belongs and to compute one or more of a receive level, a frequency offset, a timing offset and a phase offset corresponding to said receive signal.

13. The system for communication as in claim 11, comprising storage to load the state from and to store the new state, said storage being implemented as a plurality of dedicated embedded RAMs for each of the acquisition unit, matched filter, phase tracker and equalizer to which the state can be distributed in a parallel way.

14. The system for communication as in claim 1, wherein the matched filter and/or the phase tracker and/or the equalizer are each arranged to, segment-by-segment, load a further portion of the state based on the receive information and the configuration ID number, and to save information related to a new state indicative of the receive signal to which the sample segment belongs, when the sample segment has been processed.

15. The system for communication as in claim 1, wherein the controller device is arranged to configure the multi-carrier demodulator structure on a slot-by-slot basis, using a logic table with a plurality of rows and two columns.

16. A system for communication via satellite between a gateway and a plurality of terminals, the system comprising:
a controller device arranged to calculate a time-frequency plan of one or more transmit burst signals from at least one terminal of a satellite network, satnet, with a given total satnet bandwidth and to transmit information to each terminal of said at least one terminal based on said calculated time-frequency plan in order to allow said terminal to transmit a transmit burst signal comprising one or more forward error correction words, said transmit information for a first class of terminals comprising configuration information on one or more transmit burst signals so allowing said terminal of said first class of terminals to transmit said one or more transmit burst signals in a frame, each transmit burst signal being configured with said configuration information and having a time duration less than or equal to a duration of said frame,
a multi-carrier demodulator structure arranged to receive a resulting signal comprising one or more parallel receive signals corresponding to said one or more transmit burst signals of said at least one terminal of said satnet, said resulting signal having an aggregate occupied bandwidth less than or equal to said given total satnet bandwidth, and arranged to receive from said controller device receive information for said one or more parallel receive signals, said multi-carrier demodulator structure comprising
an OFDM receiver to serialize slice-by-slice said one or more parallel receive signals at an output rate greater than or equal to said given total satnet bandwidth,
wherein a slice is composed of one or more OFDM symbols yielding a serialized stream of subcarrier symbol segments corresponding to different transmissions in an OFDM grid of OFDM subcarriers and OFDM symbols,
a processing block arranged to receive said serialized stream of subcarrier symbol segments and arranged to perform
segment by segment demodulation of said subcarrier symbol segments based on the subcarrier symbol segment content, on a state indicative of the receive signal to which the subcarrier symbol segment belongs and on said receive information,
pre-FEC word aggregation,
demapping and decoding,
wherein the subcarrier symbol segments are assembled according to terminal allocation from the OFDM grid after OFDM demodulation.

17. The system for communication as in claim 16, wherein the receive information for the one or more receive signals comprises resource elements on the OFDM grid.

18. The system for communication as in claim 16, wherein the processing block comprises:
a single demodulator arranged to receive said serialized stream of one or more subcarrier symbol segments and arranged to, segment-by-segment, demodulate said subcarrier symbol segment based on the content of said subcarrier symbol segment, on a state indicative of the receive signal to which a subcarrier symbol segment belongs and on said receive information, yielding a serialized stream of symbol segments,
a pre-FEC word aggregator arranged to aggregate symbols of said serialized stream of symbol segments which belong to a single forward error correction word of said one or more forward error correction words,
a demapper and decoder arranged to demap and decode aggregated symbols received from said pre-FEC word aggregator.

19. The system for communication as in claim 16, wherein said controller device is arranged to calculate said time-frequency plan taking into account one or more of: a request for transmission for the first class of terminals, a service level agreement and information related to fairness and signal quality.

20. The system for communication as in claim 16, wherein the time duration of the transmit burst signal of each terminal corresponds to an integer number of slots.

21. The system for communication as in claim 16, wherein the OFDM receiver is arranged to attach a configuration ID number to the one or more subcarrier symbol segments.

22. The system for communication as in claim 16, wherein the transmit burst signal comprises a preamble and a plurality of groups of pilot symbols, the size of the groups being related to the communication link quality.

23. The system for communication as in claim 16, wherein the transmit burst signal comprises at least one slot free from any DMRS symbol.

24. The system for communication as in claim 23, wherein the inclusion of DMRS or PTRS symbols in a slot of the transmit burst signal depends on the communication link quality.

25. The system for communication as in claim 16, wherein the controller device is arranged to configure the multi-carrier demodulator structure on a slot-by-slot basis, using a logic table with a plurality of rows and two columns.

* * * * *